United States Patent
Shelton, IV et al.

(10) Patent No.: US 12,471,915 B2
(45) Date of Patent: Nov. 18, 2025

(54) SURGICAL STAPLING SYSTEMS WITH ADAPTIVE STAPLE FIRING ALGORITHMS

(71) Applicant: Cilag GmbH International, Zug (CH)

(72) Inventors: Frederick E. Shelton, IV, Hillsboro, OH (US); Taylor W. Aronhalt, Loveland, OH (US); Shane R. Adams, Lebanon, OH (US); Nicholas J. Ross, Franklin, OH (US); Kevin M. Fiebig, Cincinnati, OH (US)

(73) Assignee: Cilag GmbH International, Zug (CH)

( * ) Notice: Subject to any disclaimer, the term of this patent is extended or adjusted under 35 U.S.C. 154(b) by 0 days.

(21) Appl. No.: 18/379,762

(22) Filed: Oct. 13, 2023

(65) Prior Publication Data
US 2025/0120696 A1    Apr. 17, 2025

(51) Int. Cl.
*A61B 17/072* (2006.01)
*A61B 17/00* (2006.01)
*A61B 90/00* (2016.01)

(52) U.S. Cl.
CPC .. *A61B 17/072* (2013.01); *A61B 2017/00022* (2013.01); *A61B 2017/00132* (2013.01); *A61B 2017/00398* (2013.01); *A61B 2017/07278* (2013.01); *A61B 2017/07285* (2013.01); *A61B 2090/064* (2016.02)

(58) Field of Classification Search
CPC .................................................. A61B 17/072
See application file for complete search history.

(56) References Cited

U.S. PATENT DOCUMENTS

| | | | |
|---|---|---|---|
| 5,489,058 A | * | 2/1996 | Plyley .............. A61B 17/07207 227/176.1 |
| 9,016,540 B2 | | 4/2015 | Whitman et al. |
| 9,072,535 B2 | | 7/2015 | Shelton, IV et al. |
| 9,808,246 B2 | | 11/2017 | Shelton, IV et al. |
| 10,368,865 B2 | | 8/2019 | Harris et al. |
| 10,646,220 B2 | | 5/2020 | Shelton, IV et al. |
| 10,695,081 B2 | | 6/2020 | Shelton, IV et al. |
| 10,828,028 B2 | | 11/2020 | Harris et al. |
| 10,835,245 B2 | | 11/2020 | Swayze et al. |

(Continued)

FOREIGN PATENT DOCUMENTS

| | | | | | |
|---|---|---|---|---|---|
| EP | | 3545864 A2 | * | 10/2019 | .......... A61B 17/072 |
| WO | WO-2022180519 A1 | | * | 9/2022 | .......... A61B 17/072 |

OTHER PUBLICATIONS

U.S. Appl. No. 17/958,028, filed Sep. 30, 2022.

(Continued)

*Primary Examiner* — Lucas E. A. Palmer

(57) ABSTRACT

A surgical system is configured to deploy staples from a staple cartridge reload into tissue. The surgical system includes a first sensor configured to measure a first parameter indicative of a force to form the staples, and a second sensor configured to measure a second parameter indicative of a position of a sled along a staple-forming distance. The system further includes a control circuit communicatively connected to a motor, the first sensor, and the second sensor, wherein the control circuit is configured to: receive a first signal from the first sensor indicative of the first parameter; receive a second signal from the second sensor indicative of the second parameter; and detect staple malformation of the staples based on the first signal and the second signals.

20 Claims, 11 Drawing Sheets

(56) References Cited

U.S. PATENT DOCUMENTS

| | | | |
|---|---|---|---|
| 10,881,399 B2 | 1/2021 | Shelton, IV et al. | |
| 10,932,772 B2 | 3/2021 | Shelton, IV et al. | |
| 11,058,420 B2* | 7/2021 | Shelton, IV | A61B 34/76 |
| 11,576,677 B2 | 2/2023 | Shelton, IV et al. | |
| 2011/0288573 A1* | 11/2011 | Yates | A61B 50/36 |
| | | | 227/175.1 |
| 2011/0295269 A1* | 12/2011 | Swensgard | A61B 34/76 |
| | | | 606/130 |
| 2015/0280384 A1* | 10/2015 | Leimbach | H01R 35/025 |
| | | | 227/175.1 |
| 2016/0256160 A1* | 9/2016 | Shelton, IV | A61B 17/07207 |
| 2017/0296183 A1* | 10/2017 | Shelton, IV | A61B 17/072 |
| 2019/0200998 A1* | 7/2019 | Shelton, IV | A61B 5/0066 |
| 2022/0168038 A1* | 6/2022 | Shelton, IV | A61B 17/0682 |
| 2023/0301652 A1* | 9/2023 | Creamer | A61B 17/07207 |

OTHER PUBLICATIONS

U.S. Appl. No. 17/957,933, filed Sep. 30, 2022.
"IEEE 802.3 Standard", published Dec. 2008.
"ATM-MPLS Network Interworking 2.0", published Aug. 2001.

* cited by examiner

550

| Parameter | Starting Point | Duration | Frequency |
|---|---|---|---|
| P1 | S1 | D1 | f1 |
| P2 | S2 | D2 | f2 |
| P3 | S3 | D3 | f3 |
| . | . | . | . |
| . | . | . | . |
| . | . | . | . |
| Pn | Sn | Dn | fn |

FIG. 13

SURGICAL STAPLING SYSTEMS WITH ADAPTIVE STAPLE FIRING ALGORITHMS

TECHNICAL FIELD

The present disclosure is directed to surgical methods, algorithms, instruments, and systems.

SUMMARY

The present disclosure provides a surgical system for deploying staples from a staple cartridge reload into tissue. The surgical system comprises an end effector, comprising: a first jaw; a second jaw, wherein at least one of the first jaw and the second jaw is movable to grasp the tissue between the first jaw and the second jaw; a motor operable to move a sled along a staple-forming distance to lift staple drivers within the staple cartridge reload to exert a force to form the staples between the first jaw and the second jaw; a first sensor configured to measure a first parameter indicative of the force to form the staples between the first jaw and the second jaw; a second sensor configured to measure a second parameter indicative of a position of the sled along the staple-forming distance; and a control circuit communicatively connected to the motor, the first sensor, and the second sensor, wherein the control circuit is configured to: receive a first signal from the first sensor indicative of the first parameter; receive a second signal from the second sensor indicative of the second parameter; and detect staple malformation of the staples based on the first signal and the second signals.

A surgical system for deploying staples from a staple cartridge into tissue. The surgical system comprising: an end effector, comprising: a first jaw; and a second jaw movable relative to the first jaw to grasp the tissue between the first jaw and the second jaw; a motor operable in a tissue treatment event to move a drive shaft to motivate a sled to deploy staples from the staple cartridge into the tissue between the first jaw and the second jaw and motivate a knife to cut the tissue; and a control circuit communicatively connected to the motor, wherein the control circuit is configured to: implement a threshold-based pause of the tissue treatment event; resume the tissue treatment event after the threshold-based pause; determine a characteristic of a future pause in a remainder of the tissue treatment event based on a change in a parameter indicative of a tissue response during the threshold-based pause; and implement the future pause in accordance with the characteristic determined based on the change in the parameter.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, where like reference numerals refer to identical or functionally similar elements throughout the separate views, together with the detailed description below, are incorporated in and form part of the specification, and serve to further illustrate aspects of concepts that include the claimed disclosure and explain various principles and advantages of those aspects.

Figure 1:
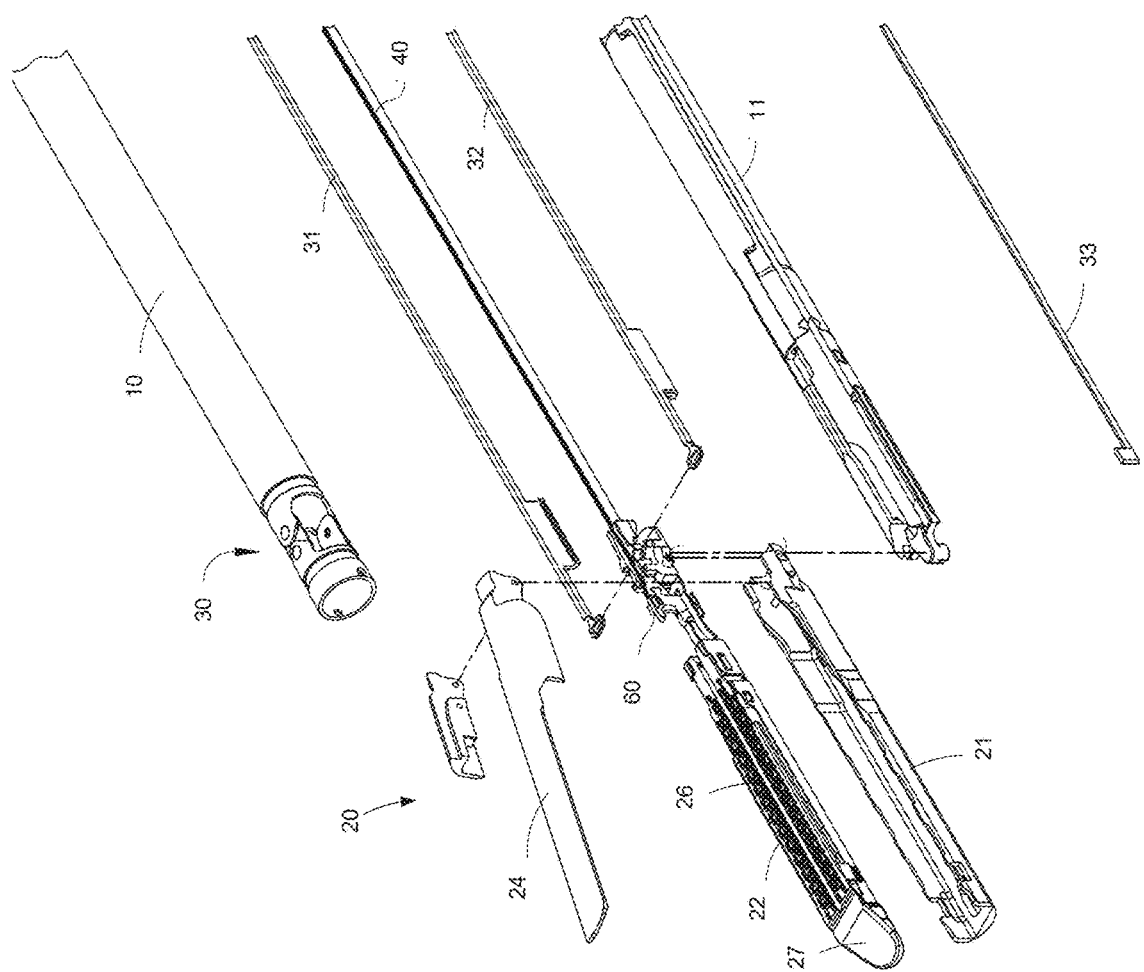

The methods, devices, and systems disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 illustrates an exploded view of an end effector and a shaft portion of a surgical stapling system, in accordance with the present disclosure.

Figure 2:
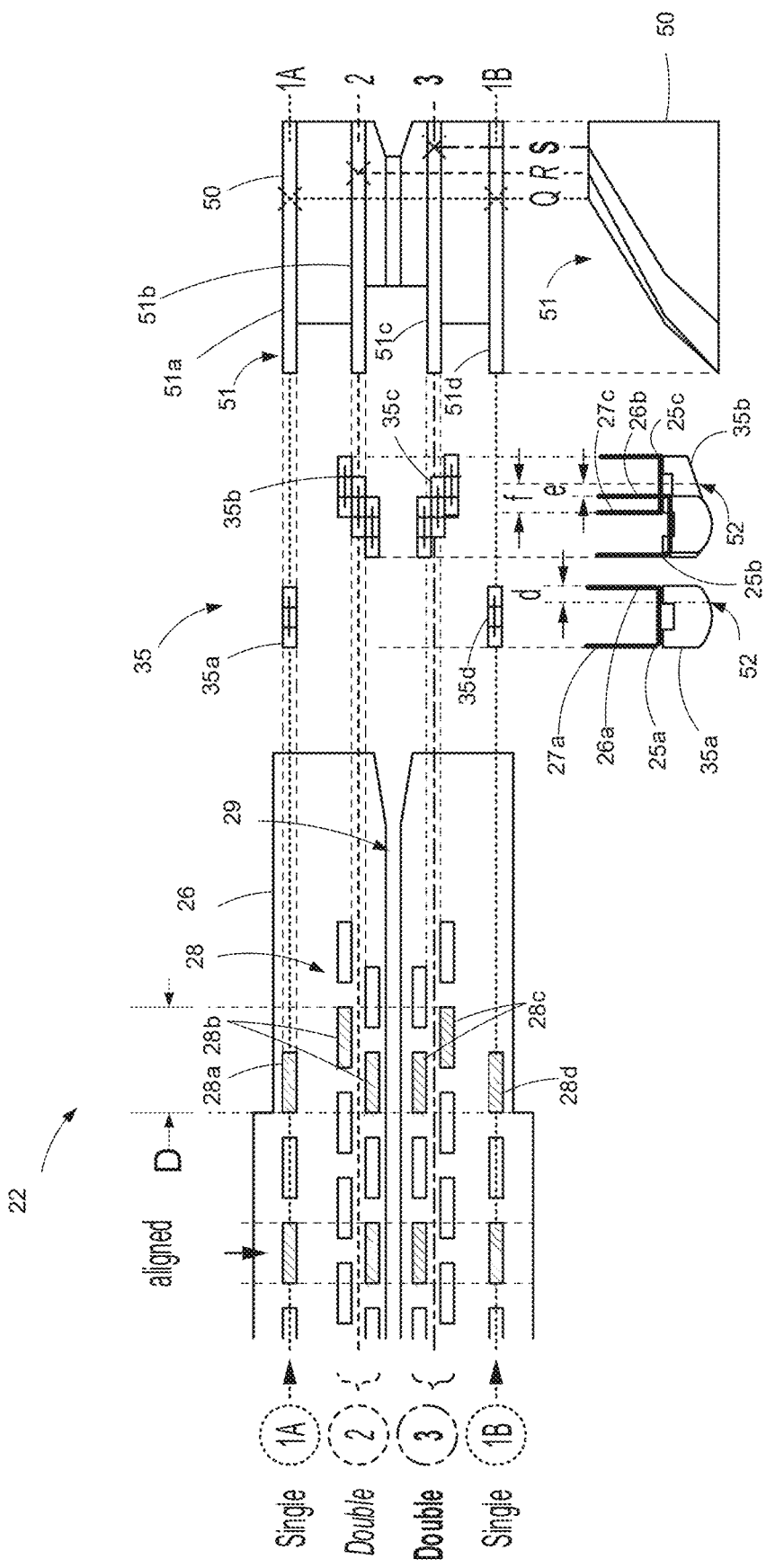

FIG. 2 is a diagram illustrating components of a staple cartridge, in accordance with the present disclosure.

Figure 3:
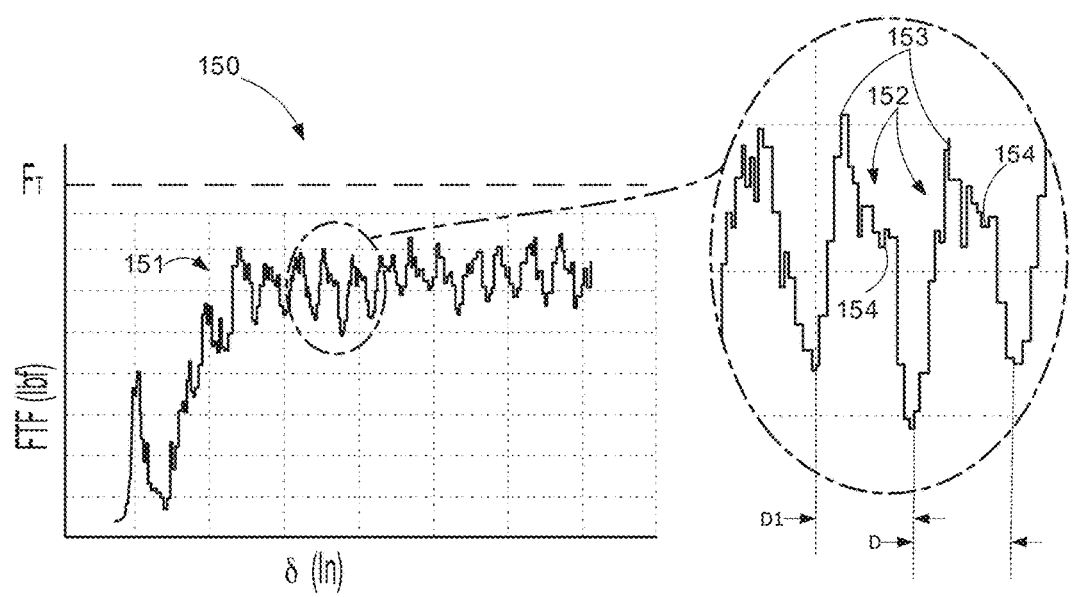

FIG. 3 is a graph depicting positional data on the X-axis and force data on the Y-axis, in accordance with the present disclosure.

Figure 3A:
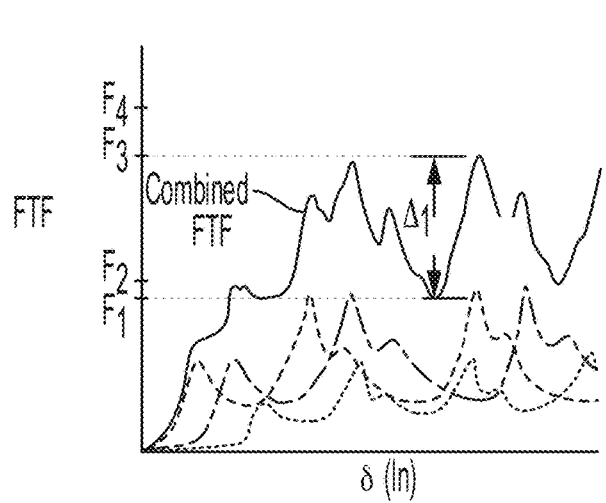

FIG. 3A is a graph depicting positional data on the X-axis and force data on the Y-axis, in accordance with the present disclosure.

Figure 3B:
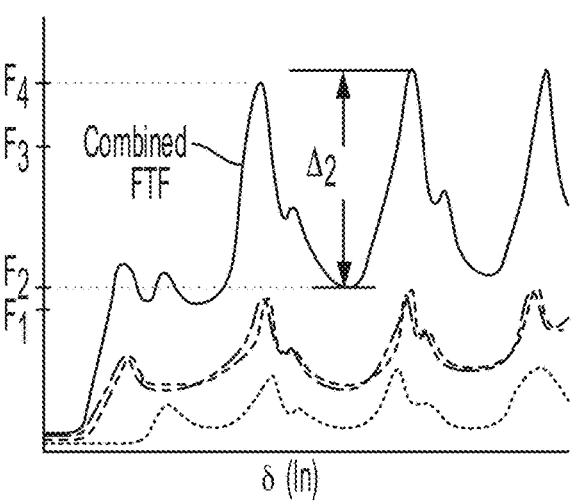

FIG. 3B is a graph depicting positional data on the X-axis and force data on the Y-axis, in accordance with the present disclosure.

Figure 4:
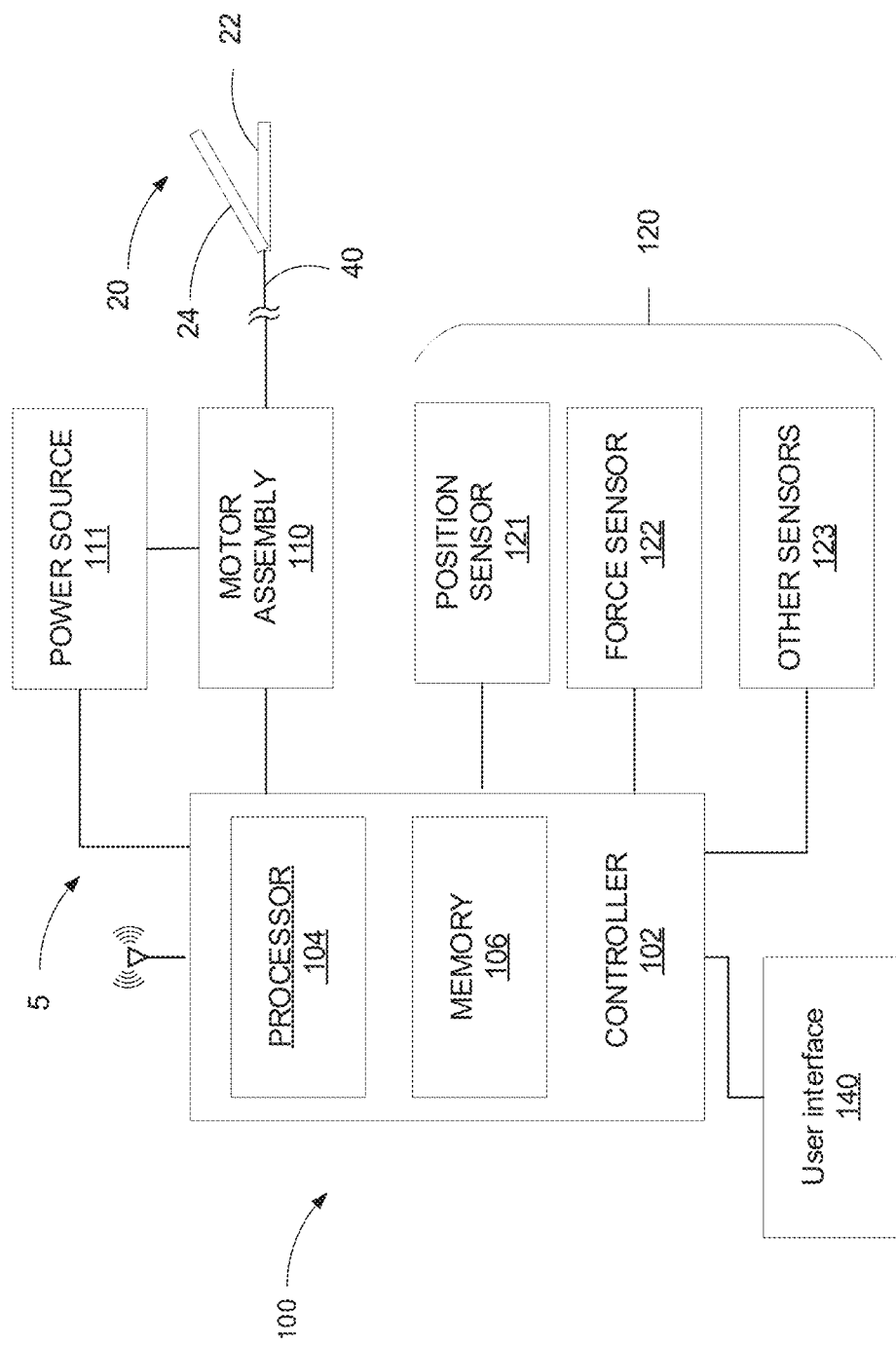

FIG. 4 is a diagram illustrating various components of a surgical stapling system, in accordance with the present disclosure.

Figure 5:
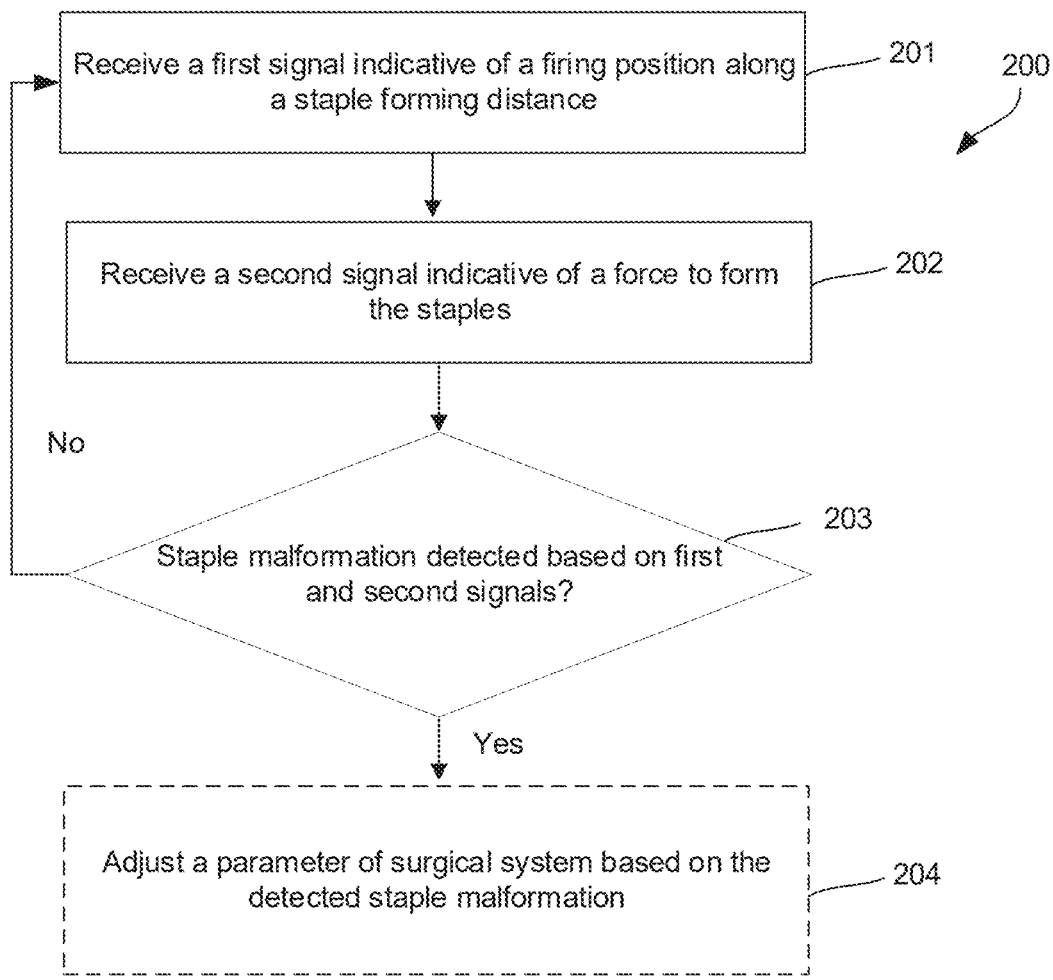

FIG. 5 is a flow diagram of a method for non-visually detecting staple malformation, in accordance with the present disclosure.

Figure 6:
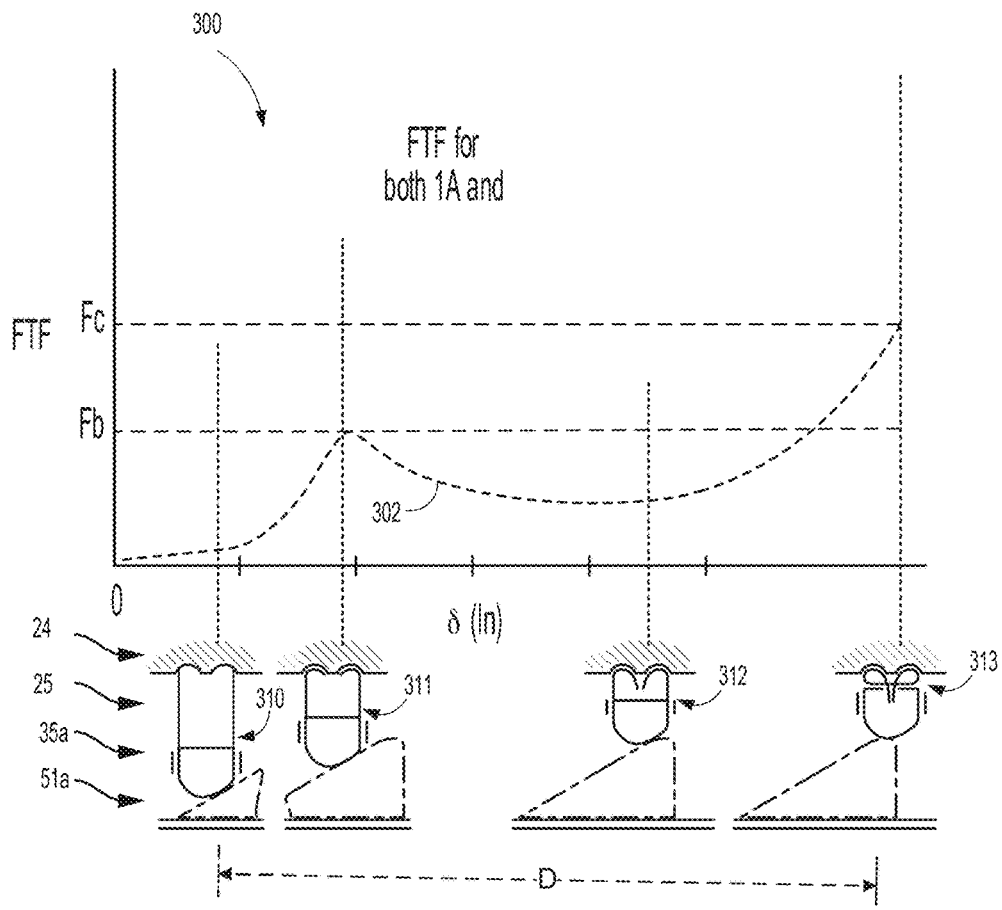

FIG. 6 is a graph depicting positional data on the X-axis and force data associated with a single staple driver on the Y-axis, in accordance with the present disclosure.

Figure 7:
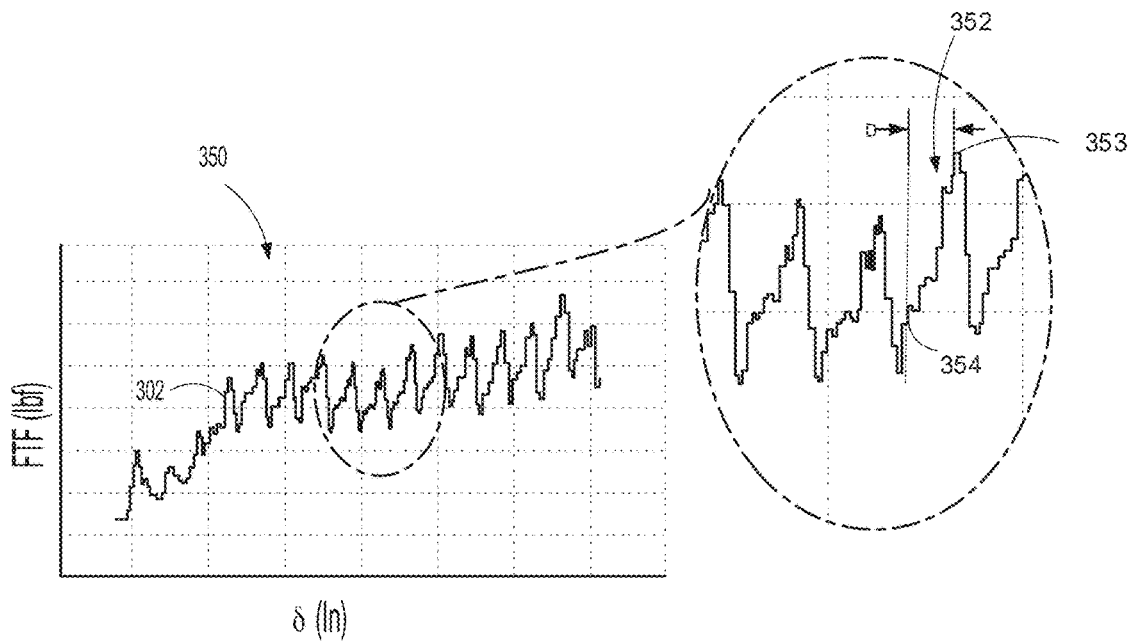

FIG. 7 is a graph depicting positional data on the X-axis and combined force data associated with groups of staple drivers on the Y-axis, in accordance with the present disclosure.

Figure 8:
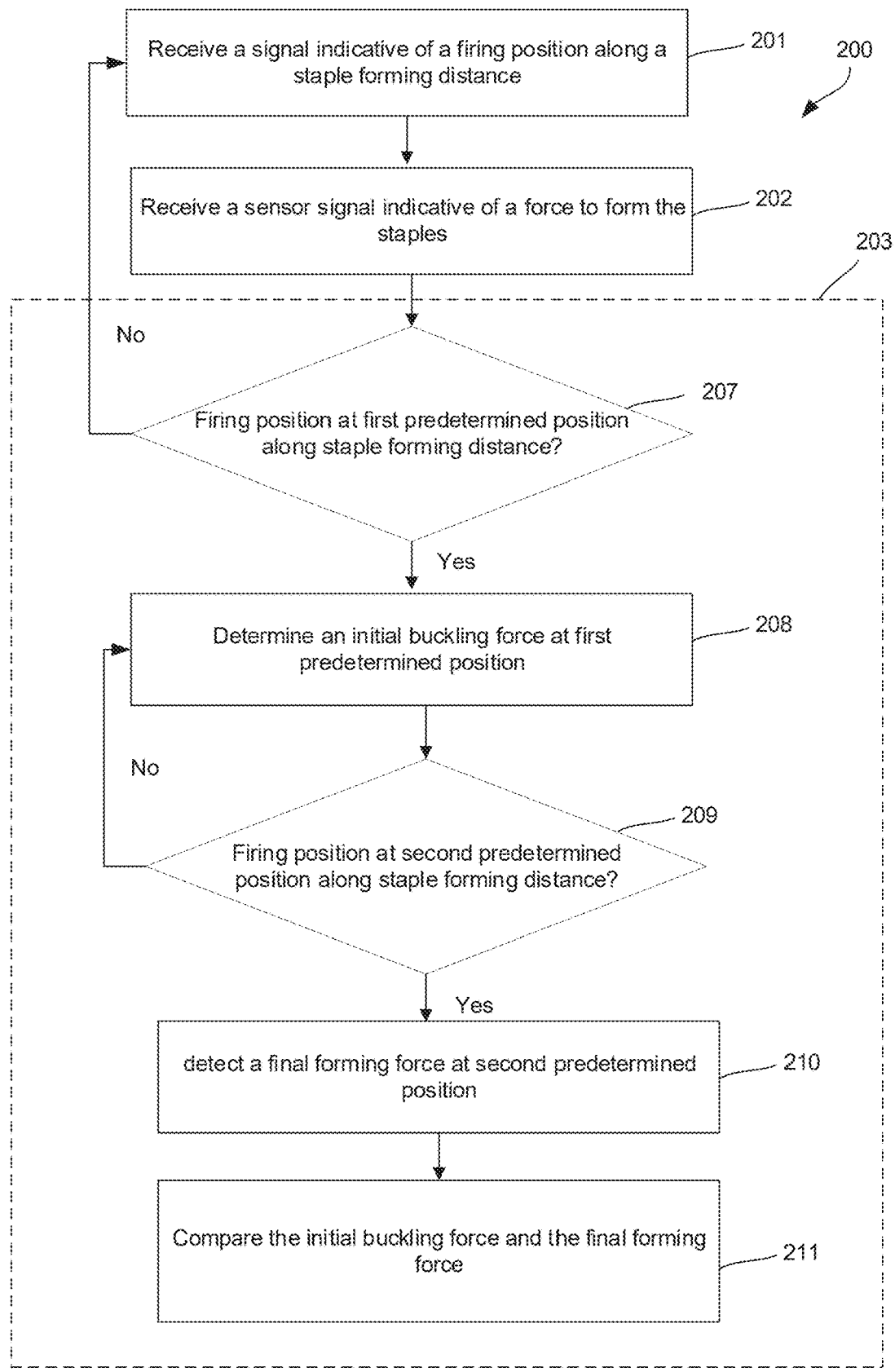

FIG. 8 a flow diagram of a method for non-visually detecting staple malformation, in accordance with the present disclosure.

Figure 9:
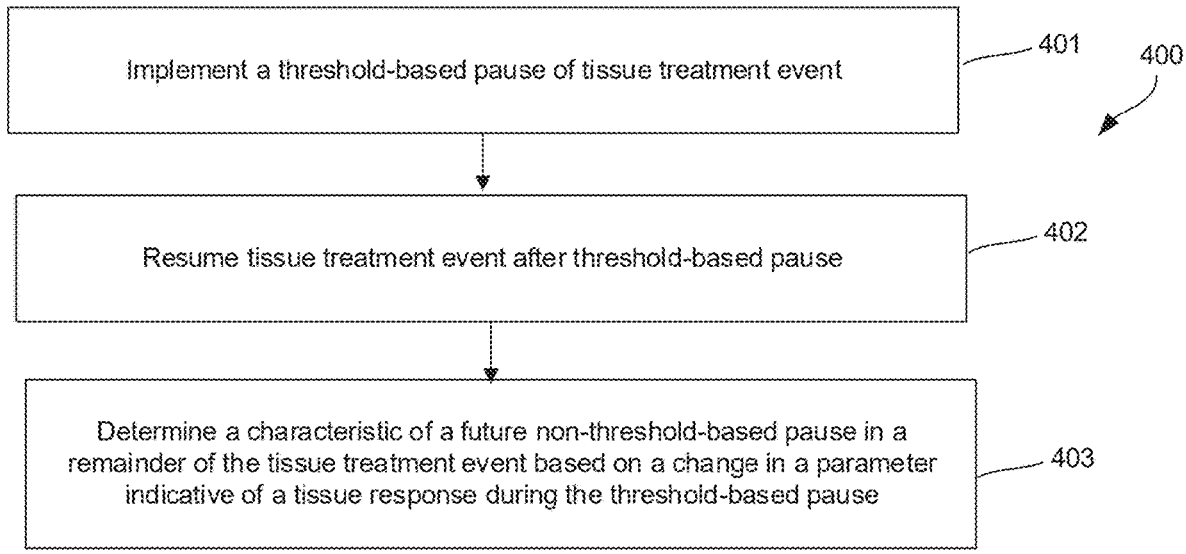

FIG. 9 a flow diagram of a method for predicatively and autonomously implementing a future pause during a firing stroke based on a tissue response to a previous pause, in accordance with the present disclosure.

Figure 10:
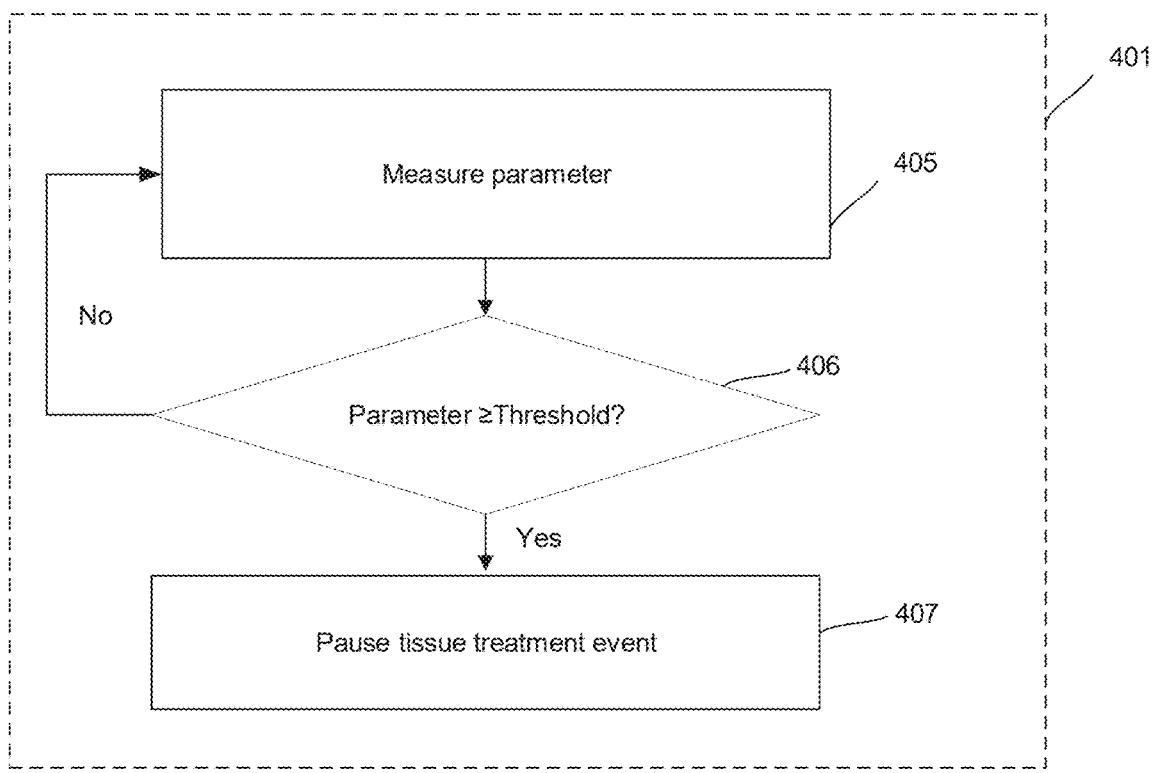

FIG. 10 is a flow diagram illustrating one embodiment of implementing a threshold-based pause of the tissue treatment event.

Figure 11:
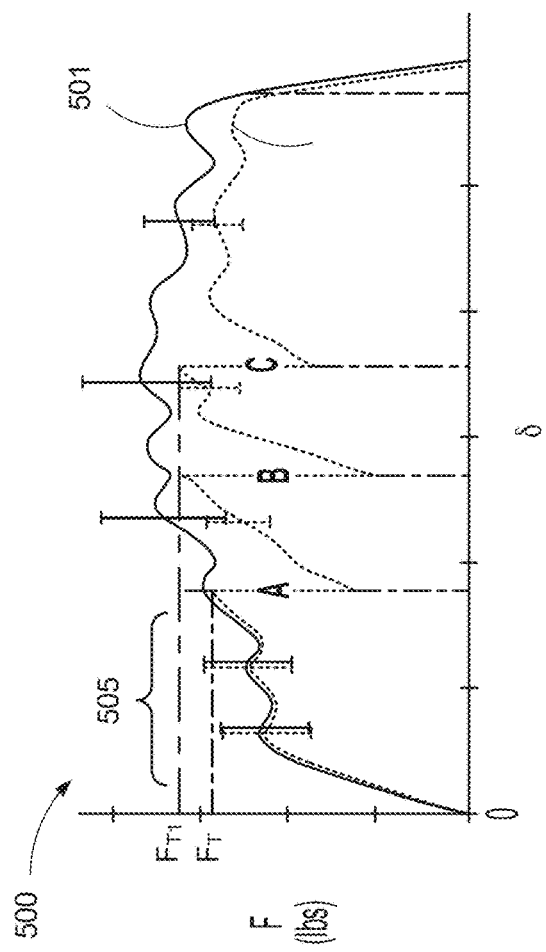

FIG. 11 is a graph illustrating a firing force data associated with a surgical stapling system, in accordance with the present disclosure.

Figure 12:
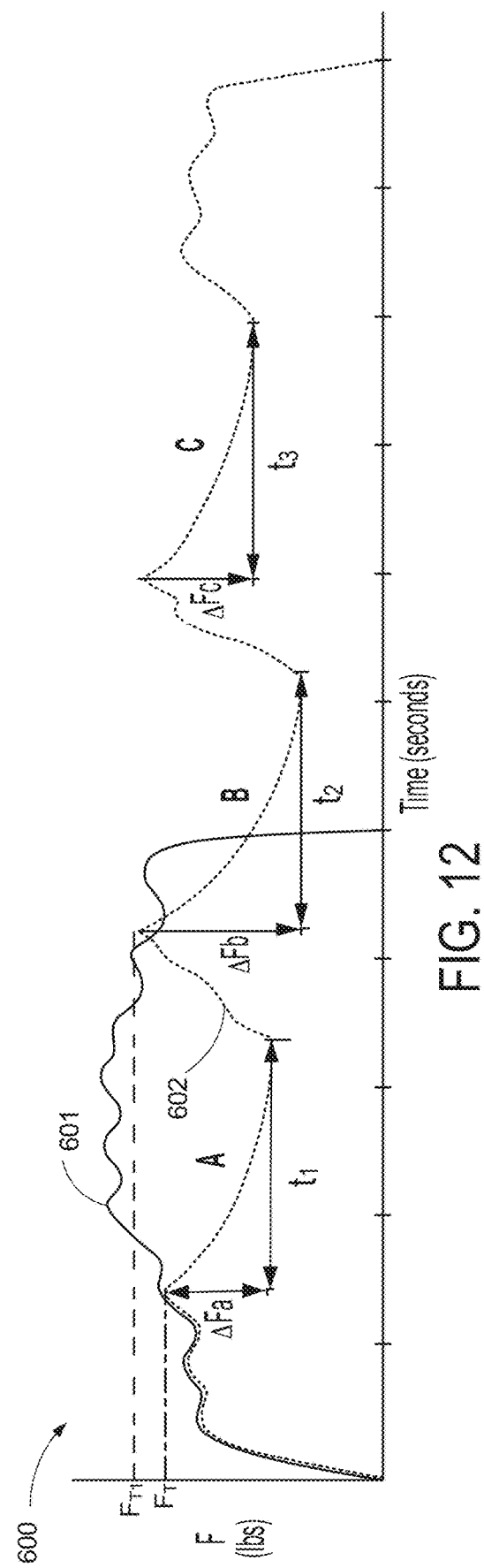

FIG. 12 is a graph illustrating a firing force data associated with a surgical stapling system, in accordance with the present disclosure.

FIG. 13 illustrates a table stored in a memory circuit of a surgical stapling system, in accordance with the present disclosure.

Figure 14:
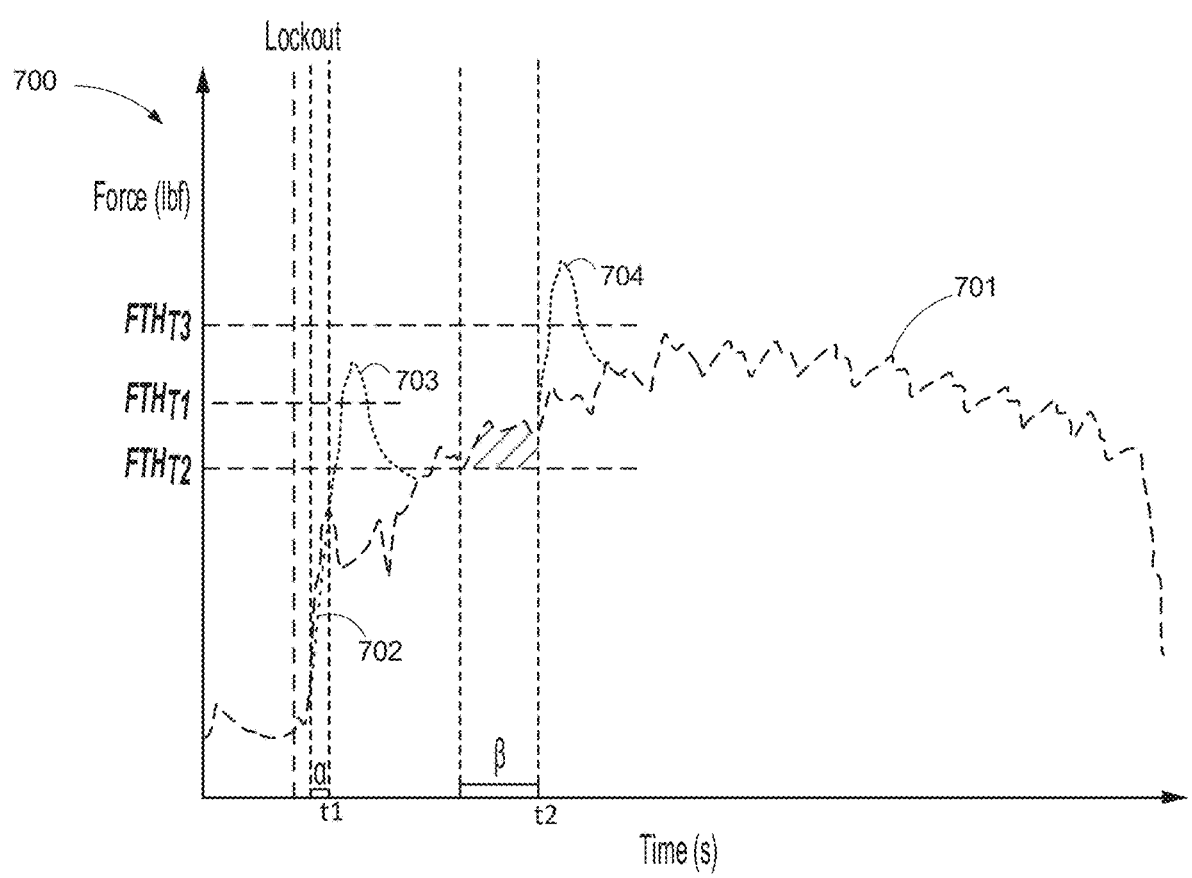

FIG. 14 is a graph illustrating two non-threshold based pauses of a tissue treatment event by the surgical stapling system, in accordance with at the present disclosure.

DESCRIPTION

Applicant of the present application owns the following U.S. Patent Applications that were filed on Oct. 13, 2023 and which are each herein incorporated by reference in their respective entireties:

U.S. patent application Ser. No. 18/379,759, titled METHOD OF OPERATING A SURGICAL STAPLING INSTRUMENT;

U.S. patent application Ser. No. 18/379,763, titled LEARNED TRIGGERS FOR ADAPTIVE CONTROL OF SURGICAL STAPLING SYSTEMS;

U.S. patent application Ser. No. 18/379,766, titled CONTROL CIRCUIT FOR ACTUATING MOTORIZED FUNCTION OF SURGICAL STAPLING INSTRUMENT UTILIZING INERTIAL DRIVE TRAIN PROPERTIES;

U.S. patent application Ser. No. 18/379,768, titled PROPORTIONATE BALANCING OF THE FUNCTION IMPACT MAGNITUDE OF BATTERY OUTPUT TO PEAK MOTOR CURRENT;

U.S. patent application Ser. No. 18/379,771, titled MOTOR OPTIMIZATION BY MINIMIZATION OF PARASITIC LOSSES AND TUNING MOTOR DRIVE CONFIGURATION;

U.S. patent application Ser. No. 18/379,773, titled APPARATUS AND METHOD TO REDUCE PARASITIC LOSSES OF THE ELECTRICAL SYSTEM OF A SURGICAL INSTRUMENT;

U.S. patent application Ser. No. 18/379,776, titled SURGICAL TOOL WITH RELAXED FLEX CIRCUIT ARTICULATION;

U.S. patent application Ser. No. 18/379,777, titled WIRING HARNESS FOR SMART STAPLER WITH MULTI AXIS ARTICULATION;

U.S. patent application Ser. No. 18/379,781, titled SURGICAL SYSTEM WITH WIRELESS ARRAY FOR POWER AND DATA TRANSFER; and U.S. patent application Ser. No. 18/379,784, titled SURGICAL STAPLE CARTRIDGE COMPRISING REPLACEABLE ELECTRONICS PACKAGE.

Applicant of the present application owns the following U.S. Patent Applications that were filed on Oct. 13, 2023 and which are each herein incorporated by reference in their respective entireties:

U.S. patent application Ser. No. 18/379,790, titled METHOD OF ASSEMBLING A STAPLE CARTRIDGE;

U.S. patent application Ser. No. 18/379,793, titled CONTROL SURFACES ON A STAPLE DRIVER OF A SURGICAL STAPLE CARTRIDGE;

U.S. patent application Ser. No. 18/379,796, titled INTEGRAL CARTRIDGE STIFFENING FEATURES TO REDUCE CARTRIDGE DEFLECTION;

U.S. patent application Ser. No. 18/379,801, titled STAPLE CARTRIDGE COMPRISING WALL STRUCTURES TO REDUCE CARTRIDGE DEFLECTION;

U.S. patent application Ser. No. 18/379,803, titled PANLESS STAPLE CARTRIDGE ASSEMBLY COMPRISING RETENTION FEATURES FOR HOLDING STAPLE DRIVERS AND SLED;

U.S. patent application Ser. No. 18/379,805, titled STAPLE CARTRIDGE COMPRISING A SLED HAVING A DRIVER LIFT CAM;

U.S. patent application Ser. No. 18/379,808, titled SURGICAL STAPLE CARTRIDGES WITH SLEDS CONFIGURED TO BE COUPLED TO A FIRING DRIVER OF A COMPATIBLE SURGICAL STAPLER;

U.S. patent application Ser. No. 18/379,810, titled STAPLE CARTRIDGE COMPRISING A COMPOSITE SLED;

U.S. patent application Ser. No. 18/379,811, titled SURGICAL INSTRUMENTS WITH JAW AND FIRING ACTUATOR LOCKOUT ARRANGEMENTS LOCATED PROXIMAL TO A JAW PIVOT LOCATION;

U.S. patent application Ser. No. 18/379,815, titled SURGICAL INSTRUMENTS WITH LATERALLY ENGAGEABLE LOCKING ARRANGEMENTS FOR LOCKING A FIRING ACTUATOR;

U.S. patent application Ser. No. 18/379,817, titled DUAL INDEPENDENT KEYED LOCKING MEMBERS ACTING ON THE SAME DRIVE MEMBER;

U.S. patent application Ser. No. 18/379,820, titled ADJUNCTS FOR USE WITH SURGICAL STAPLING INSTRUMENTS;

U.S. patent application Ser. No. 18/379,822, titled ADJUNCTS FOR USE WITH SURGICAL STAPLING INSTRUMENTS;

U.S. patent application Ser. No. 18/379,826, titled JAW CONTROL SURFACES ON A SURGICAL INSTRUMENT JAW;

U.S. patent application Ser. No. 18,379,827, titled ZONED ALGORITHM ADAPTIVE CHANGES BASED ON CORRELATION OF COOPERATIVE COMPRESSION CONTRIBUTIONS OF TISSUE;

U.S. patent application Ser. No. 18/379,831, titled STAPLE CARTRIDGES COMPRISING TRACE RETENTION FEATURES; and U.S. patent application Ser. No. 18/379,832, titled STAPLE CARTRIDGES COMPRISING STAPLE RETENTION FEATURES.

Various methods, instruments, and systems are provided for performing surgical procedures. Various surgical systems disclosed herein include working portions that can be inserted into a body in any way, such as through a natural orifice, through an incision or puncture hole formed in tissue, etc. The working portions or end effector portions can be inserted directly into a patient's body or can be inserted through an access device that has a working channel. As the present Detailed Description proceeds, it will be understood that the various unique and novel arrangements of the various forms of surgical systems disclosed herein may be effectively employed in connection with robotically-controlled surgical systems and/or hand-held surgical systems. Various robotic systems, instruments, components and methods are disclosed in U.S. patent application Ser. No. 13/118,241, entitled SURGICAL STAPLING INSTRUMENTS WITH ROTATABLE STAPLE DEPLOYMENT ARRANGEMENTS, which is incorporated by reference herein in its entirety.

Referring to FIGS. 1-4, a surgical stapling system 5 includes a shaft 10 and an end effector 20 extending from the shaft 10. The end effector 20 includes a first jaw 19 and a second jaw 23. The first jaw 19 defines a channel 21 and a staple cartridge 22 removably positionable in the channel 21. Other embodiments are envisioned in which a staple cartridge is not removable, or at least readily replaceable, from the first jaw 19. The second jaw 23 includes an anvil 24 configured to deform staples 25 (See FIG. 2) ejected from the staple cartridge 22. The second jaw 23 is pivotable relative to the first jaw 19 about a closure axis to transition the end effector 20 between an open configuration and a closed configuration. Other embodiments are envisioned in which the first jaw 19 is pivotable relative to the second jaw 23.

The surgical stapling system 5 further includes an articulation joint 30 configured to permit the end effector 20 to be rotated, or articulated, relative to the shaft 10. The end effector 20 is rotatable about an articulation axis extending through the articulation joint 30. Other embodiments are envisioned which do not include an articulation joint. In the illustrated example, cooperating articulation rods 31, 32 are configured to articulate the end effector 20 relative to the shaft 10 about an articulation joint 30. The surgical stapling system 5 further includes an articulation lock bar 33 configured to selectively prevent the articulation of the end effector 20.

The staple cartridge 22 includes a cartridge body 27 with a proximal end, a distal end, and a deck 26 extending between the proximal end and the distal end. In use, the staple cartridge 22 is positioned on a first side of the tissue to be stapled and the anvil 24 is positioned on a second side of the tissue. In accordance with the present disclosure, the anvil 24 may be moved toward the staple cartridge 22 to compress and clamp the tissue against the deck 26. Further, in accordance with the present disclosure, the staple cartridge 22 may be moved relative to the anvil 24 or, alternatively, both the staple cartridge 22 and the anvil 24 may be moved to compress and clamp the tissue.

A drive shaft 40 is movable distally to motivate a firing beam 60 to transition the end effector 20 toward the closed configuration, thereby compressing the tissue. In the illustrated example, the firing beam 60 is in the form of an I-beam that includes a first cam and a second cam configured to engage the first jaw 19 and second jaw 23, respectively. As the firing beam 60 is advanced distally, the first cam and the second cam can control the distance, or tissue gap, between the deck of the staple cartridge 22 and the anvil 24. In the illustrated example, the firing beam 60 motivates a sled 50 to deploy the staples 25 from the staple cartridge 22. In accordance with the present disclosure, a separate closure mechanism, e.g., a closure tube, can be employed to transition the end effector 20 toward the closed configuration. Also in accordance with the present disclosure, the firing beam 60 may or may not include the first and second cams. Further, in accordance with the present disclosure, the firing beam 60 may be in the form of an E-beam with first, second, and third cams. In accordance with the present disclosure, the firing beam 60 and the closure tube may cooperatively effect closure of the end effector 20. Also, in accordance with the present disclosure, the firing beam 60 may only effect deployment of the staples 25.

In accordance with the present disclosure, as illustrated in FIG. 1, the firing beam 60 may include a knife configured to incise the tissue captured intermediate the staple cartridge 22 and the anvil 24. It is desirable for the knife to be positioned at least partially proximal to the ramped surfaces such that the staples are ejected ahead of the knife. More details about alternative embodiments of surgical stapling systems, suitable for use with the present disclosure, are disclosed in U.S. patent application Ser. No. 15/385,887 entitled METHOD FOR ATTACHING A SHAFT ASSEMBLY TO A SURGICAL INSTRUMENT AND, ALTERNATIVELY, TO A SURGICAL ROBOT, and U.S. patent application Ser. No. 16/209,416, entitled METHOD OF HUB COMMUNICATION, PROCESSING, DISPLAY, AND CLOUD ANALYTICS, which are hereby incorporated by reference herein in their entireties.

The staples 25 removably stored in the cartridge body 27 can be deployed into the tissue. The cartridge body 27 includes staple cavities 28 defined therein wherein staples 25 are removably stored in the staple cavities 28. The staple cavities 28 are arranged in longitudinal rows. In the illustrated example, three rows of staple cavities 28 are positioned on a first side of a longitudinal slot 29 and three rows of staple cavities 28 are positioned on a second side of the longitudinal slot. Other arrangements of staple cavities 28 and staples 25 are possible.

The staples 25 are supported by staple drivers 35 in the cartridge body 27. The staple drivers 35 are movable between a first, or unfired position, and a second, or fired, position to eject the staples 25 from the staple cavities 28. The staple drivers 35 are movable between their unfired positions and their fired positions by a sled 50 that includes ramped surfaces 51 configured to slide under the staple drivers 35 and lift the staple drivers 35, and the staples 25 supported thereon, toward the anvil 24. In the illustrated example, the distal movement of the drive shaft 40 causes the sled 50 to move distally within the staple cartridge 22 to deploy the staples 25.

Referring primarily to FIG. 2, the sled 50 includes a first ramped surface 51a, a second ramped surface 51b, a third ramped surface 51c, and a fourth ramped surface 51d configured to engage a first staple drive 35a, a second staple driver 35b, a third staple driver 35c, and a fourth staple driver 35d, respectively, along a staple-forming distance (D) to deploy staples 25 from corresponding staple cavities 28a, 28b, 28c, 28d for forming against corresponding forming pockets in the anvil 24. In the illustrated example, the staple drivers 35b, 35c are double drivers, while the staple drivers 35a, 35d are single drivers. Double drivers support two staples in two separate staple cavities, while single drivers support a single staple in a single staple cavity.

FIG. 3 illustrates one exemplification of a staple-forming distance (D). In accordance with the present disclosure, the staple-forming distance (D) can be characterized as a distance spanning a number of the staple cavities 28 housing staple drivers 35 that are simultaneously engaged by the sled 50. Further, in accordance with the present disclosure, the staple-forming distance (D) can be characterized as a distance travelled by the sled 50 while simultaneously engaging a group of staple drivers 35 to transition the staple drivers 35 between their unfired positions and their fired positions, thereby causing the staples 25 positioned on the staple drivers 35 to be formed against the anvil 24.

The sled 50 and the staple drivers 35a-d are configured to stagger staple formation of staples 25 in staple cavities 28a-d. The ramped surfaces 51 are shaped and arranged to facilitate an offset firing of the staples 25 in the staple cavities 28a-d to reduce the forces experienced by the sled 50 as the sled 50 is moved along the staple-forming distance (D). In other words, the ramped surfaces 51 can be tailored to stagger staple-formation progress in a manner that maintains the firing forces experienced by the sled 50 at, or below, a predetermined threshold ($F_T$) (FIG. 3).

In the example illustrated in FIG. 2, the ramped surfaces 51a, 51d are identical, or at least substantially the same, which causes the single staple drivers 35a, 35b to be simultaneously lifted by the sled 50 at the same pace. The ramped surfaces 51b, 51c are different from each other, and different from the ramped surfaces 51a, 51b, which causes the double staple drivers to be lifted by the sled 50 at a different pace from each other, and at a different pace from the staple drivers 35a, 35d. In other words, the peak forces associated with the double drivers 35b, 35c are out of phase with each other, and are also out of phase with peak forces associated with the single drivers 35a, 35d.

With continued reference to FIG. 2, the ramped surfaces 51 cause a peak force associated with simultaneously forming the staples supported by the single staple drivers 35a, 35d to occur, at Q, ahead of a peak force associated with forming staples supported by the staple drivers 35b (at R), 35c (at S). Q, R, S represent positions on the ramped surfaces 51 of the sled 50 corresponding to the staggered peak forces associated with staple drivers 35a, 35d, staple driver 35b, and staple driver 35c, respectively. Staggering the staple-formation progress of staples in staple cavities 28a-d positioned along the staple forming distance (D) reduces the forces experienced by the sled 50 as the sled 50 simultaneously lifts the staple drivers 35a-d through various stages of staple formation including, for example, a staple buckling stage and/or a staple final-crunching stage. Peak forces associated with other groups of staple drivers 35 can be similarly staggered.

Other factors can influence staple-formation progress and peak forces such as, for example, geometries of cam surfaces of the staple drivers, and contact locations between the ramped surfaces 51 and the staple drivers 35. In the illustrated example, contact locations 52, 53 define locations on the cam surfaces of the staple drivers 35a-d where the ramped surfaces 51 of the sled 50 first engage and lift the staple drivers 35a-d to deploy the staples 25. The staggered staple-formation progress is aided by geometries of cam surfaces of the staple drivers 35a-d and/or contact locations 52, 53 between the cam surfaces of the staple drivers 35a-d and corresponding ramped surfaces 51a-d.

In the illustrated example, the contact location 52 of the staple driver 35a is a distance (d) from a proximal staple leg 26a of a staple 25a supported by the staple driver 35a. The contact location 52 is closer to the proximal staple leg 26a than a distal staple leg 27a of the staple 25a. Furthermore, the contact location 53 of the staple driver 35b is a distance (e) from a proximal leg 26b of a distal staple 25b supported by the staple driver 35b, and a distance (f) from a distal staple leg 27c of a proximal staple 25c supported by the staple driver 35b. The distances d, e, f are different from one another, and are tailored to support the staggered staple-formation progress along the staple-forming distance (D). In the illustrated example, the distance (f) is greater than the distance (d), and the distance (d) is greater than the distance (e). Similar contact locations and/or contact surfaces geometries are implemented in the staple drivers 35c, 35d, and other staple drivers 35 along the firing stroke.

FIG. 3 is a graph 150 of forces exerted against the sled 50 at various positions along a firing stroke that yields a deployment of the staples from the staple cartridge 22. The graph 150 depicts displacement/positional data of the sled 50 on the X-axis and load/force data exerted against the sled 50 on the Y-axis. Curved line 151 demonstrates the collective force excreted by consecutive groups of staple drivers 35 against the sled 50 at different positions along the firing stroke. Each group (e.g., 35a-d) of staple drivers spans a staple-forming distance (e.g., D), and is represented on the graph 150 by a force profile 152, along each staple-forming distance, which includes a lowest peak 153 and a highest peak 154. The firing stroke encompasses multiple staple-forming distances, the number of which depends on the number of groups of staple drivers 35 in the staple cartridge 22.

Since the forces exerted by the staple drivers 35a-d against the sled 50 vary depending on the staple formation stages of the staples 25 in the staple cavities 28a-d along the staple forming distance (D), staggering the transition of such staples through the different stages maintains the overall firing force required to move the sled 50 along the staple-forming distances (e.g. D, D1) at, or below, a predetermined threshold ($F_T$), as illustrated in FIG. 3. In addition, staggering the staple formation progress also ensures a smoother force curve. FIGS. 3A and 3B provide a comparison between the staggered approach (FIG. 3A) and the non-staggered approach (FIG. 3B). The differences ($\Delta_1$, $\Delta_2$) between similarly situated peak and valley forces indicate that the staggered approach yields a smoother force curve than the non-staggered approach.

Various methods, devices, and systems provided by the present disclosure yield useful clinical outcomes extrapolated from the positional data and the force data of the graph 150. As discussed in greater detail below, the shape of the force profiles 152, location of the highest peaks 153, and/or other characteristics of the curved line 151 can be considered along with various characteristics of the staple cartridge 22 to yield useful clinical outcomes such as, for example, detecting staple malformation and/or controlling various operational parameters associated with the surgical stapling system 5.

FIG. 4 is a block diagram illustrating one exemplification of the surgical stapling system 5. Various components of the surgical stapling system 5 communicate with a control circuit 100. Such components may receive signals from and/or transmit signals to the control circuit 100. Such signals include command signals, status signals, sensor signals, and/or any other suitable signals. The control circuit 100 can be configured to implement various methods described herein with the aid of various components of the surgical stapling system in communication with the control circuit 100. In the illustrated example, the control circuit 100 includes a controller 102 comprising one or more processors 104 (e.g., microprocessor, microcontroller) communicatively connected to at least one memory circuit 106. The memory circuit 106 stores machine executable instructions that when executed by the processor 104, cause the processor 104 to execute machine instructions to implement various processes described herein. The processor 104 may be any one of a number of single or multi-core processors known in the art. The memory circuit 106 may comprise volatile and non-volatile storage media. The processor 104 may include an instruction processing unit and an arithmetic unit. The instruction processing unit may be configured to receive instructions from the memory circuit 106. In accordance with the present disclosure, the control circuit 100 may include a combinational logic circuit and/or a sequential logic circuit.

In accordance with the present disclosure, the control circuit 100 may be configured to communicate with a motor assembly 110 that includes a motor 113 and a motor controller, for example. The motor assembly 110 may generate rotational motion to effect a translating motion of the drive shaft 40. The control circuit 160 may generate a motor set point signal. The motor set point signal may be provided to a motor controller. The motor controller may comprise one or more circuits configured to provide a motor drive signal to a motor to drive the motor 113 as described herein. In some examples, the motor 113 may be a brushed DC electric motor. For example, the velocity of the motor 113 may be proportional to the motor drive signal. Further, in accordance with the present disclosure, the motor 113 may be a brushless DC electric motor and the motor drive signal may comprise a PWM signal provided to one or more stator windings of the motor. Also, in accordance with the present disclosure, the motor controller may be omitted, and the control circuit 100 may generate the motor drive signal directly. The position, movement, displacement, and/or translation of the drive shaft 40, the firing beam 60 and/or the sled 50 (collectively referred to herein as the "firing assembly") can be measured/monitored by the control circuit 100 based on input from one or more sensors 120.

The motor assembly 110 may be powered by a power source 111 that in one form may comprise a removable power pack. The power pack may include a housing configured to support a plurality of batteries that may each include, for example, a Lithium Ion ("LI") or other suitable battery, and may be connected in series, for example. The power source 111 may be replaceable and/or rechargeable. Other power sources are contemplated by the present disclosure.

The sensors 120 may include a position sensor 121 configured to sense a position, movement, displacement, and/or translation of one or more components of the firing assembly such as, for example, the drive shaft 40, the firing beam 60 and/or the sled 50. The sensor 121 may include any type of sensor that is capable of generating position data that indicate a position of the firing assembly. In some examples, the sensor 121 may include an encoder configured to provide a series of pulses to the control circuit 100 as the firing assembly translates distally and proximally. The control circuit 100 may track the pulses to determine the position, movement, displacement, and/or translation of the components of the firing assembly. Other suitable position sensors may be used, including, for example, a proximity sensor. Other types of position sensors may provide other signals indicating motion of the firing assembly. Where the motor 113 is a stepper motor, the control circuit 100 may track the position of components of the firing assembly by aggregating the number and direction of steps that the motor 113 has been instructed to execute. The sensors 120 may be located in the end effector 20 or at any other portion of the surgical stapling system 5.

Various sensors 120 may be adapted to measure various other parameters such as gap distance versus time, tissue compression versus time, and anvil strain versus time. The sensors 120 may comprise a magnetic sensor, a magnetic field sensor, a strain gauge, a pressure sensor, a force sensor, an inductive sensor such as an eddy current sensor, a resistive sensor, a capacitive sensor, an optical sensor, and/or any other suitable sensor for measuring one or more parameters of the end effector 20. The one or more sensors 120 may be sampled in real time during a clamping operation by the processor 104 of the control circuit 100. The control circuit 100 receives real-time sample measurements to provide and analyze time-based information and assess, in real time, a measured parameter such as, for example, force and/or position parameters.

The one or more sensors 120 may comprise a strain gauge, such as a micro-strain gauge, configured to measure the magnitude of the strain in the anvil 24 during a clamped condition. The strain gauge provides an electrical signal whose amplitude varies with the magnitude of the strain. The sensors 120 may comprise a pressure sensor configured to detect a pressure generated by the presence of compressed tissue between the anvil 24 and the staple cartridge 22. The sensors 120 may be configured to detect impedance of a tissue section located between the anvil 24 and the staple cartridge 22 that is indicative of the thickness and/or fullness of tissue located therebetween.

The sensors 120 may include a force sensor 122 configured to measure forces associated with firing and/or closure conditions. For example, sensor 122 can be at an interaction point between a closure tube and the anvil 24 to detect the closure forces applied by the closure tube to the anvil 24. The forces exerted on the anvil 24 can be representative of the tissue compression experienced by the tissue section captured between the anvil 24 and the staple cartridge 22. The sensor 122 can be positioned at various interaction points along the closure drive system to detect the closure forces applied to the anvil 24.

Similarly, a force sensor 122 can be at an interaction point between components of the firing assembly to detect the firing forces applied by the firing assembly to advance the firing beam 60 and the sled 50 to deploy the staples into tissue and cut the tissue. The measured forces represent a firing load experienced by the firing assembly. Alternatively, or additionally, a current sensor can be employed to measure the current drawn by the motor of the motor assembly 110. The force required to advance the firing assembly corresponds to the current drawn by the motor 113. The measured force can be converted to a digital signal and provided to the control circuit 100.

Further to the above, the surgical stapling system 5 includes a user interface 140 having an input device (e.g., a capacitive touchscreen or a keyboard) for receiving inputs from a user and an output device (e.g., a display screen) for providing outputs to a user. Outputs can include data from a query input by the user, suggestions for products or mixes of products to use in a given procedure, and/or instructions for actions to be carried out before, during, or after surgical procedures. The user interface 140 can be in communication with the control circuit 100, as illustrated in FIG. 4.

Various algorithms, instruments, and systems are provided for non-visually detecting staple malformation. Staple malformation occurs when staples 25 deployed into the tissue grasped by the end effector 20 are not properly formed between the anvil 24 and the staple drivers 35 of the staple cartridge 22. Examples of malformed staples include staples where at least one of the staple legs is over-formed or under-formed thereby yielding a formed-staple shape that deviates from a standard B-shape. Staple malformation can lead to clinical complication including, for example, excessive bleeding and/or improper tissue healing. A clinician may not be able to visually detect an occurrence of staple malformation. Without detection, choices that caused a staple malformation can be repeated, thereby leading to additional complications.

FIG. 5 is a method 200 for detecting staple malformation. With reference to FIG. 5 together with FIG. 4, in accordance with the present disclosure, the control circuit 100 may execute the method 200 to detect staple malformation between the anvil 24 and the staple drivers 35. Program instructions in accordance with the method 200, or portions of the method 200, are stored in a memory circuit such as, for example, the memory circuit 106. The processor 104 may execute the program instructions to achieve a clinical outcome associated with staple malformation. In accordance with the present disclosure, portions of the method 200 can be executed by the processor 104 independently from other portions of the method 200, or by another processer that may be in communication with the processor 104, for example.

According to the method 200, the control circuit 100 receives 201 a first signal from the position sensor 121. The first signal is indicative of a firing position along a staple-forming distance (e.g., D, D1). The control circuit 100 receives 202 a second signal from the force sensor 122. The second signal is indicative of a force to form staples 25 residing in staple cavities 28 positioned along the staple-forming distance. Further to the method 200, the control circuit 100 detects 203 malformation of the staples 25 based on the first signal and based on the second signal, as described in greater detail below. Optionally, according to the method 200, the control circuit 100 can perform a clinical action in response to detecting 203 the staple malformation. In the illustrated example, according to the clinical action, the control circuit 100 adjusts 204 a parameter of the surgical stapling system 5 based on the detection 203 of the staple malformation. The parameter can be, for example, a cartridge selection for the next staple cartridge reload to address detected 203 staple malformation.

In one exemplification, adjusting 204 a parameter of the surgical stapling system 5 can include recommending a different type of cartridge for the next staple cartridge reload to address staple formation. The control circuit 100 can be configured to receive an input indicative of a type of staple cartridge 22 that yielded the detected 203 staple malformation. The input can be in the form of a user input through the user interface 140, for example. Additionally, or alternatively, the input can be received from an identification chip on the staple cartridge 22 that is configured to communicate a staple cartridge identifier to the control circuit 100. In response to detecting 203 a staple malformation, the processor 104 may query a database 124 that stores various staple cartridge types for a staple cartridge reload different from the identified staple cartridge that yielded the staple malformation. The control circuit 100 may recommend a staple cartridge reload based on the results of the query through the user interface 140, for example. As described in greater detail below, the selection can be based on the received 201 first signal and based on the received 202 second signal. In accordance with the present disclosure, the control circuit 100 may issue an alert through the user interface 140 in response to detecting 203 staple malformation. The control circuit 100 also may prompt for a user input through the user interface 140 in response to detecting 203 the staple malformation, for example.

FIGS. 6 and 7 are graphs 300, 320, respectively, that illustrate certain characteristics of force data and positional data indicative of staple malformation. Graphs 300, 320 depict displacement/positional data of the sled 50 on the X-axis and load/force data exerted against the sled 50 on the Y-axis. Graph 300 depicts a force curve 302 that illustrates the force exerted against the ramped surface 51a of the sled 50 by a single staple driver 35a (excluding forces associated with staple drivers 35b-d) along a staple-forming distance (D), as the staple 25 transitions through the staple forming stages, including a first contact stage 310, a buckling stage 311, a forming stage 312, and an over-crunching stage 313. While the graph 300 focuses on the force associated with a single driver 35a, the graph 320 of FIG. 7 focuses on combined forces exerted against the sled 50 by groups of staple drivers (e.g. staple drivers 35a-d) along multiple staple forming distances (e.g. D) along the firing stroke.

In the example illustrated in FIG. 6, over crunching 313 is associated with over-forming the staple 25 such that the staple legs are pushed below the base of the staple leg. Over crunching 313 can be caused by a staple cartridge reload that is too thin. The staple forming forces over form, or over crunch, the staple, which alters the standard B-shape of the formed staples. Staple cartridge reloads comprise staples with cross-sectional dimensions (e.g. thin, medium, thick) that are designed for various different applications (e.g. different tissue types).

As illustrated in FIG. 6, over crunching 313 yields an unexpected peak force Fc toward the end of the staple-forming distance (D), which is greater than a peak force Fb associated with the staple buckling stage 311. In contrast, a normal staple formation is characterized by a higher buckling force than a crunching force, wherein the higher buckling force precedes the lower crunching force along the staple forming distance. In accordance with the present disclosure, a normal staple formation can be associated with a predetermined delta, or difference, between a peak buckling force, at the buckling stage 311, and a peak crunching force, at the forming stage 312, for example. In contrast, a staple malformation can be detected where the measured delta deviates from the predetermined delta. To detect force discrepancies characteristic of staple malformation at the individual staple driver level, a force sensor 122 can be placed at a point of engagement between the cam surface of a staple driver 35 and a ramped surface of the sled 50, for example.

In accordance with the present disclosure, the staple cartridge reload may be too thick (i.e. includes staples with relatively large cross-sectional dimensions for a selected application), and a staple formation may not be properly completed. Consequently, the buckling forces may be lower than a predefined threshold, and the final forming, or crunching, forces may also deviate from a predefined range, which indicates that the final forming, or crunching, may not have occurred.

The force discrepancies at the individual staple driver level translate into force discrepancies at the combined forces level associated with all the staple drivers 35, as illustrated in FIG. 7. A comparison between graph 150 of FIG. 3, which represents normal staple formation, and graph 320 of FIG. 7, which represents staple malformation, outlines the force discrepancies associated with staple malformation at the combined forces level. In accordance with the present disclosure, staple malformation may be detected 203 based on the shape of the force profile along a predefined staple forming distance (D), for example. FIG. 7 illustrates a generally ascending force profile 322 along the staple forming distance (D), while FIG. 3 illustrates a generally descending force profile 152 that is characteristic of normal staple malformation. Accordingly, the control circuit 100 can be configured to determine a force profile along a predefined staple forming distance based on the received 201 first signal and the received 202 second signal, and detect 203 staple malformation based on the determined force profile.

FIG. 8 is a flow diagram of one embodiment of a method 350 for detecting staple malformation, wherein detecting 353 staple malformation is based on detecting an initial staple-buckling force and a final staple-forming force at predefined firing positions along a staple forming distance (D). With reference now to FIG. 8 together with FIG. 5, in the illustrated embodiment, according to the method 350, the control circuit 100 monitors firing position of the sled 50 based on the received 351 the first signal, and corresponding forces exerted against the sled 50 based on the received 352 second signal. The control circuit 100 then determines 357 whether the firing position is at a first predetermined position along a staple forming distance (D). If the firing position is not at a first predetermined position along a staple forming distance (D), the method 350 continues along the No path. If the firing position is at a first predetermined position along a staple forming distance (D), the method 350 continues along the Yes path, and control circuit 100 determines 358 an initial buckling force based on force sensor 122 measurements. Additionally, the method 350 determines 359 whether the firing position is at a second predetermined position along the staple forming distance (D). If the firing position is not at a second predetermined position along the staple forming distance (D), the method 350 continues along the No path. If the firing position is a second predetermined position along a staple forming distance (D), the method 350 continues along the Yes path, and the control circuit 100 determines 360 a final forming force.

According to the method 350, the control circuit 100 then detects staple malformation based on the initial buckling force and the final staple forming force. For example, according to the method 350, the control circuit compares 361 the initial buckling force and the final forming force to each other, or to predetermined thresholds, and may detect staple malformation based on the comparison. In accordance with the present disclosure, the staple malformation may be detected 353 based on a result of a mathematical relation between the determined values of the initial buckling force and the final forming force. Further, in accordance with the present disclosure, staple malformation may be detected 353 if the initial buckling force is less than the final forming force. Also, in accordance with the present disclosure, staple malformation may be detected 353 based on a ratio between the final forming force and the initial buckling. Further, in accordance with the present disclosure, staple malformation may be detected 353 if the initial buckling force is outside a predefined threshold range, and/or if a ratio between the final forming force and the initial buckling force is outside a predefined threshold.

It will be appreciated that the first and second predetermined positions along the staple forming distance (D) depend on various characteristics of the staple cartridge 22 such as, for example, the shape of the cam surfaces of the staple drivers, the shape of the ramped surfaces of the sled, and/or the spacing of the staple cavities. Accordingly, the control circuit 100 can be configured to identify the first and second predetermined positions based on a cartridge identifier that can be received by the control circuit 100 through the user interface 140, or via a communication from an identification chip of the staple cartridge 22, for example. In accordance with the present disclosure, the first and second predetermined positions can be identified by the processor 104 in a look-up table or a database 124 based on the received cartridge identifier.

After identifying the first and second predetermined positions, the control circuit 100 can receive position data from the position sensor 121 to determine the position of the sled 50 and detect the sled 350 reaching the first determined position and the second predetermined position. The control circuit 100 can receive force measurement data from the force sensor 122 to determine the initial buckling force at the first predetermined position, and the final forming, or crunching, force at the second predetermined position. Accordingly, the initial buckling force and the final forming, or crunching, force can be determined by the control circuit 100 based on input from both the position sensor 121 and the force sensor 122.

As previously described with reference to FIGS. 4 and 5, the initial buckling and final forming, or crunching, force values can inform a selection of the next cartridge reload. In accordance with the present disclosure, the control circuit 100 can be configured to adjust 204 a parameter of the surgical stapling system 5 by recommending a thinner or thicker staple cartridge reload based on the determined values of the initial buckling and final forming, or crunching, forces.

With reference to FIGS. 1 and 4, the present disclosure provides various methods, devices, and systems for lowering force-to-fire (FTF), which is a force needed to advance the drive shaft 40 during a tissue treatment event (e.g., firing stroke) by a surgical stapling system 5. In accordance with the present disclosure, the motor assembly 110 may be operable in the tissue treatment event to move the drive shaft 40 to motivate the firing beam 60 and the sled 50 to deploy staples 25 from a staple cartridge 22 into tissue between the anvil 24 and the staple cartridge 22, and, optionally, to cut the tissue with the knife of the firing beam 60, for example.

Various characteristics of the tissue grasped between the staple cartridge 22 and the anvil 24 can influence the FTF. For example, tissue thickness and/or tissue type can influence FTF. An inexperienced clinician may operate the end effector 25 to grasp an excessively thick tissue bite. The increased thickness and/or stiffness of the tissue can yield an increased resistance to the advancement of the drive shaft 40 by the motor assembly 110 during a tissue treatment event, which increases the FTF. The control circuit 100 may utilize a predetermined parameter threshold to maintain the FTF within a safe range. The control circuit 100 may pause the tissue treatment event if the parameter reaches, or exceeds, the predetermined parameter threshold. As discussed in greater detail below, the parameter is indicative of the tissue response to the tissue treatment event, and can be measured by one or more of the sensors 120.

In accordance with the present disclosure, pausing the tissue treatment event can give the tissue time to relax, and time for fluid within the tissue to egress to parts of the tissue not grasped by the end effector 20, which reduces the tissue resistance, and ultimately reduces the FTF when the tissue treatment event is resumed. In accordance with the present disclosure, however, where the tissue resistance may be more due to the tissue stiffness than the tissue fluid build-up, the tissue response during a pause of the tissue treatment even can be less prominent. Stiffness of tissue change based on the tissue type and patient specific issues. Understanding how the tissue responds to a pause in the tissue treatment event informs future pauses and/or generally informs changes to aspects of the tissue treatment event such as, for example, the motion of the drive shaft 40 and/or current supplied to the motor assembly 110, for example.

The present disclosure further provides methods, devices, and systems for predictively and autonomously implementing a future pause to the tissue treatment event based on the tissue response during the threshold-based pause. In accordance with the present disclosure, the future pauses may be based on the tissue response during a previous threshold-based pause interval, but are independent of the FTF threshold. In other words, the future pauses are not triggered by reaching, or exceeding, an FTF threshold. Rather, they are predictively and autonomously implemented based on the tissue response to one or more previous pauses. Further, in accordance with the present disclosure, a future pause may be implemented based on one or more previous non-threshold-based pauses, one or more previous threshold-based pauses or a combination of one or more threshold-based pauses, and one or more non-threshold-based pauses.

FIG. 9 is a flow diagram of a method 400 for predicatively and autonomously implementing a future non-threshold-based pause of a tissue treatment event being run by the motor assembly 110 based on a tissue response during a previous threshold-based pause of the tissue treatment event. With reference to FIG. 9 together with FIG. 4, according to the method 400, the control circuit 100 implements 401 a threshold-based pause of the tissue treatment event, resumes 402 the tissue treatment event after the threshold-based pause, and determines 403 a characteristic of a future pause in a remainder of the tissue treatment event based on a change in a parameter indicative of a tissue response during the previous pause.

In accordance with the present disclosure of the method 400, the previous pause may be a threshold-based pause and the future pause is a non-threshold based pause. Also, in accordance with the present disclosure of the method 400, the previous pause may be a threshold-based pause and the future pause is also a threshold-based pause. Further, in accordance with the present disclosure of the method 400, the previous pause is a non-threshold-based pause and the future pause is a threshold-based pause. Further, in accordance with the present disclosure of the method 400, the previous pause is a non-threshold-based pause and the future pause is a non-threshold-based pause.

In accordance with the present disclosure, the characteristic of the future pause determined 403 by the method 400 can be a starting point of the future pause. Further, in accordance with the present disclosure, the starting point can be a selected position along the firing stroke. Also, in accordance with the present disclosure, the starting point can be a selected time during the tissue treatment event. Further, in accordance with the present disclosure, the characteristic of the future pause determined 403 by the method 400 can be a duration (D) of the future pause. Also, in accordance with the present disclosure, the duration can be a time-based duration. Further, in accordance with the present disclosure, the duration (D) may be based on a tissue response. For example, a pause can be maintained until a parameter (e.g. force exerted against the drive shaft 40) associated with the tissue response reaches a predetermined value.

In accordance with the present disclosure, the characteristic of the future pause determined 403 by the method 400 can be a frequency of repetition of the future pause. Further, in accordance with the present disclosure, the characteristic of the future pause determined 403 by the control circuit 100 according to the method 400 can be any combination selected from a group that includes the starting point, the duration, and/or the frequency parameters. Other characteristics of the future pause can also be determined 403 by the control circuit 100.

In accordance with the present disclosure, the parameter can be indicative of the tissue resistance exerted against the drive shaft 40 during the threshold-based pause. Also, in accordance with the present disclosure, the parameter can be measured by one or more of the sensors 120. Further, in accordance with the present disclosure, the parameter can be a force exerted by the tissue against the drive shaft 40 during the threshold-based pause, which can be measured by a force sensor 122, for example.

FIG. 10 is a flow diagram illustrating one embodiment of implementing 401 a threshold-based pause of the tissue treatment event, in accordance with the method 400. With reference to FIG. 10 together with FIGS. 4 and 9, in the illustrated example, the control circuit 100 employs one or more sensors 120 to measure 405 the parameter. The one or more sensors 120 can transmit signals to the processor 104 indicative of the parameter. If 406 the parameter reaches, or exceeds, a predetermined threshold, the processor 104 pauses 407 the tissue treatment event.

In accordance with the present disclosure, the control circuit may pause 407 the tissue treatment event by disconnecting power from the power source 111 to the motor assembly 110. Alternatively, the control circuit may pause 407 the tissue treatment event by reducing power supplied to the motor assembly 110. The reduced power can be a power level sufficient to maintain the drive shaft 40 at a current position, but not cause an additional advancement of the drive shaft 40 beyond the current position. The control circuit 100 can be configured to receive positional data from a position sensor 121, for example, indicative of the position of the drive shaft 40, and gradually reduce the current supplied to the motor 113 of the motor assembly 110 until the positional data indicate that no additional change is detected in the position of the drive shaft 40, for example.

Referring to FIGS. 11, 12, graphs 500, 600 illustrate some of the benefits of implementing pauses during a tissue treatment event by the surgical stapling system 5. Graphs 500, 600 compare tissue responses during a tissue treatment event implemented with and without pausing, by comparing the behavior of the force exerted against the drive shaft 40 (FIGS. 1 and 4) with and without pausing. Graph 500 depicts force data on the Y-axis and position data on the X-axis, while the graph 600 depicts the force data on the Y-axis and time on the X-axis. Curve forces 501, 601 represent a tissue treatment event implemented by the surgical stapling system 5 at a constant speed and without pauses, while curves 502, 602 represent a comparable tissue treatment event implemented by the surgical stapling system 5 with three pauses. It will be appreciated that the election of three pause is for illustrative purposes, and that more or less than three pauses are contemplated by the present disclosure.

With reference now to FIGS. 1, 4, 11, and 12, the position data can be measured by one or more positions sensors 121, and indicate an advancement progress of one or more components of the firing assembly (e.g., drive shaft 40, sled, 50, firing beam 60) along a firing stroke that yields a deployment of the staple into tissue grasped by the end effector 20, and cutting of the tissue by the knife of the firing beam 60, for example. The force data can be measured by one or more force sensors 122 that can be position along one or more engagement points of the firing assembly, for example. Time can be measured by the processor 104, or can be measured separately by a separate clock/timer, for example.

During an initial part of the firing stroke, prior to pausing, the force curves 501, 601 are similar to the force curves 502, 602, respectively. In the illustrated examples, corresponding standard deviations determined during the initial part 505 of the firing stroke are identical, or virtually identical. In accordance with the present disclosure, the standard deviations may be calculated based on a force data set along a portion of the firing stroke. Further, in accordance with the present disclosure, the standard deviations may be calculated based on a force data set that includes force peak and valley portions. Tight standard deviations are indicative of a smooth FTF during a tissue treatment event.

In the illustrated example, a first pause (pause A) of the tissue treatment event is implemented by the control circuit 100 based on reaching, or exceeding, a predetermined force threshold ($F_T$). Tissue grasped by the end effector 20 is allowed to relax during the Pause A, which reduces the force exerted against the drive shaft 40, as evident from comparing the force curves 601, 602. In the illustrated example, pause A is implemented for a time period ($t_1$). The force (F) exerted against the drive shaft 40 by the tissue gradually decreases by an amount ($\Delta Fa$) during the time period ($t_1$). Upon completion of the pause A, the control circuit 100 resumes the tissue treatment event.

As previously discussed in the present disclosure, a change in one or more parameters during a pause can be informative of the tissue response during a tissue treatment event. In the illustrated example, the change in the force (F) exerted against the drive shaft 40 by the amount ($\Delta Fa$) can indicate characteristics of the tissue response that can be useful in implementing future pauses of the tissue treatment event.

In the illustrated example, the control circuit 100 can determine the amount of change in force ($\Delta Fa$), and utilize this value to determine one or more characteristics of one or more future pauses such as, for example, pause B and/or pause C. Additionally, or alternatively, the control circuit 100 can determine a rate of change of the force (F) during that time period ($t_1$), and utilize this value to determine one or more characteristics of one or more of future pauses such as, for example, pause B and/or pause C.

In accordance with the present disclosure, the control circuit 100 may determine one or more characteristics of one or more of future pauses such as, for example, pause B and/or pause C based on the shape of the force curve 601 during a previous pause such as, for example, pause A. For example, a slope of the curve force during pause A can inform decisions regarding future pauses B, C. Also, in accordance with the present disclosure, a steep slope can indicate a greater thickness and/or flexibility of the tissue grasped by the end effector 20. In contrast, a shallow slope can indicate a lesser thickness and/or flexibility of the tissue. Further, in accordance with the present disclosure, the slope value may be directly proportional to the thickness and/or flexibility of the grasped tissue.

With reference to FIGS. 4 and 13, in accordance with the present disclosure, the processor 104 may query a table 550 stored in the database 124, or which can be stored in a memory circuit (e.g., the memory circuit 105) to determine one or more characteristics of a future pause (e.g., pause B, C) based on a change in a parameter indicative of the tissue response during a previous pause (e.g., Pause A). The table 550 or table may store values representative of the change in the parameter during the previous pause, and values representative of corresponding characteristics of future pauses. As described above, the characteristics of the future pause may include a starting point(S), a duration (D), and/or a frequency (f) of a future pause.

Referring back to FIGS. 11 and 12 together with FIG. 4, the control circuit 100 implements a second pause (pause B). In the illustrated example, a starting point(S) of the pause B is based on a force threshold ($F_{T1}$). Said another way, the pause B is triggered by the force (F) reaching, or exceeding, the predetermined force threshold ($F_{T1}$). In accordance with the present disclosure, a starting point(S) of the pause B can be determined based on a parameter associated with the pause A, for example.

In any event, certain characteristics of the pause B are determined based on the pause A. In the illustrated example, a duration (D) of the pause B is determined based on the amount of change in force ($\Delta Fa$) detected during the pause A. As described above, the control circuit 100 may determine the amount of change in force ($\Delta Fa$) based on input from one or more force sensors 122, for example, and then query the database 550 for values of a duration (D) of the pause B corresponding to the amount of change in force ($\Delta Fa$).

Further to the above, the control circuit 100 implements a third pause (pause C). In the illustrated example, a starting point (S) of the pause B, and a duration (D), of the pause C is selected from the database 550 based on an amount of change in force ($\Delta Fa$) detected during the pause A and/or the amount of change in force ($\Delta Fb$) detected during the pause B, for example.

In accordance with the present disclosure, the control circuit 100 may assign weights to changes to a parameter associated with multiple previous pauses based on where and/or when the previous pauses were implemented along the firing stroke. The assigned weights may then contribute in determining a characteristic of the future pause. The weights can, for example, be assigned based on where and/or when the previous pauses were implemented along the firing stroke. In the illustrated example, a first weight is assigned for the amount of change in force ($\Delta Fa$) and a second weight is assigned to the amount of change in force ($\Delta Fb$). In accordance with the present disclosure, the weight value may depend on the temporal relation between a previous pause and a future pause.

FIG. 14 is a graph 700 illustrating two non-threshold based pauses of a tissue treatment event by the surgical stapling system 5 (FIG. 4), in accordance with the present disclosure. As indicated above, a previous non-threshold-based pause can inform a future non-threshold based pause, in the same tissue treatment event, as illustrated in FIG. 14, or in a future tissue treatment event.

Graph 700 depicts firing force on the x-axis and time on the y-axis. In the illustrated example, a pause to the tissue treatment event is implemented at t1 based on the behavior of firing force curve 701 during a time period α at an initial portion of the tissue treatment event. The pause at t1 prevents the firing force from reaching force threshold ($FTH_{T1}$). Dashed curve 703 outlines a behavior of the firing force without the pause at t1.

In the example illustrated in FIG. 14 together with FIG. 4, the pause at t1 is implemented based on a slope 702 of the firing force curve 701 during the time period α. The control circuit 100 determines the slope 701 based on input from the force sensor 122, and determines whether to stop the tissue treatment event based on the value of the slope 702. In accordance with the present disclosure, the decision to pause the tissue treatment event may be based on a database, equation, and/or table stored in a memory unit such as, for example, the memory 106.

Another pause to the tissue treatment event is implemented at t2 based on the behavior of firing force curve 701 during and/or after the pause at t1, and/or the behavior of the firing force curve 701 at a time period β at an intermediate portion of the tissue treatment event. In the illustrated example, the firing force curve 702, while not reaching the force threshold ($FTH_{T1}$), due to the pause started at t1, still exceeded a force threshold ($FTH_{T2}$), which informs an effectiveness of the pause at t1. The behavior of the firing force during the pause is a factor that is considered in implementing the pause at t2.

In the illustrated example, the pause at t2 is implemented based on the behavior of the firing force during the time period β, which is determined by calculating the area under the firing force curve 701 during the time period β, and is further based on the behavior of the firing force after the pause at t1. Dashed curve 704 outlines a behavior of the firing force without the pause at t2, where the firing force would have exceeded a force threshold ($FTH_{T3}$).

In accordance with the present disclosure, the time periods α, β can be predetermined time periods, selected by an algorithm implementing the pauses of the tissue treatment event. The selection can be made based on one or more factors including a staple cartridge characteristic (e.g., size, color, type, length, staple height, staple diameter) and/or tissue characteristics (e.g., thickness, density, impedance), for example. Further, in accordance with the present disclosure, the time periods α, β can be adaptively determined based on the behavior of the firing force during the tissue treatment event, or previous tissue treatment events.

Various aspects of the subject matter described herein are set out in the following numbered Clauses:

Clause 1. A surgical system (5) for deploying staples (25) from a staple cartridge (22) reload into tissue, the surgical system comprises an end effector (20), comprising: a first jaw (19); a second jaw (23), wherein at least one of the first jaw and the second jaw is movable to grasp the tissue between the first jaw and the second jaw; a motor (113) operable to move a sled (50) along a staple-forming distance to lift staple drivers (35) within the staple cartridge reload to exert a force to form the staples between the first jaw and the second jaw; a first sensor (121) configured to measure a first parameter indicative of the force to form the staples between the first jaw and the second jaw; a second sensor (122) configured to measure a second parameter indicative of a position of the sled along the staple-forming distance; and a control circuit (100) communicatively connected to the motor, the first sensor, and the second sensor, wherein the control circuit is configured to: receive a first signal from the first sensor indicative of the first parameter; receive a second signal from the second sensor indicative of the second parameter; and detect staple malformation of the staples based on the first signal and the second signals.

Clause 2. The surgical system of Clause 1, wherein the configuration of the control circuit to detect the staple formation comprises the control circuit configured to: determine an initial buckling force associated with formation of the staples along the staple-forming distance based on the first signal and the second signal; and determine a final crunching force associated with the formation of the staples along the staple-forming distance based on the first signal and the second signal.

Clause 3. The surgical system of Clause 2, wherein the control circuit is further configured to adjust an operational parameter of the surgical system based on the initial buckling force and the final crunch force.

Clause 4. The surgical system of Clause 3, further comprising a user interface, wherein the configuration of the control circuit to adjust the operational parameter comprises the control circuit configured to recommend, through the user interface, a different staple cartridge reload.

Clause 5. The surgical system of any of Clauses 2-4, wherein the configuration of the control circuit to detect the staple malformation further comprises the control circuit configured to compare the initial buckling force to the final crunching force.

Clause 6. The surgical system of any of Clauses 2-4, wherein the configuration of the control circuit to detect the staple formation comprises the control circuit configured to determine a mathematical relation between the initial buckling force and the final crunching force indicative of the staple malformation.

Clause 7. The surgical system of Clause 6, wherein the mathematical relation is indicative of the initial buckling force being lesser than the final crunching force.

Clause 8. The surgical system of any of Clauses 1-7, wherein the staple-forming distance is a distance movable by the sled while in contact with the staple drivers.

Clause 9. The surgical system of any of Clauses 1-8, wherein the staple-forming distance is selected based on the staple cartridge reload.

Clause 10. A surgical system for deploying staples from a staple cartridge into tissue, the surgical system comprising: an end effector, comprising: a first jaw; and a second jaw movable relative to the first jaw to grasp the tissue between the first jaw and the second jaw; a motor operable in a tissue treatment event to move a drive shaft to motivate a sled to deploy staples from the staple cartridge into the tissue between the first jaw and the second jaw and motivate a knife to cut the tissue; and a control circuit communicatively connected to the motor, wherein the control circuit is configured to: implement a threshold-based pause of the tissue treatment event; resume the tissue treatment event after the threshold-based pause; determine a characteristic of a future pause in a remainder of the tissue treatment event based on a change in a parameter indicative of a tissue response during the threshold-based pause; and implement the future pause in accordance with the characteristic determined based on the change in the parameter.

Clause 11. The surgical system of Clause 10, further comprising a sensor configured to measure the parameter, wherein the sensor is communicatively connected to the control circuit.

Clause 12 The surgical system of Clause 11, wherein the parameter is a force exerted against the drive shaft.

Clause 13. The surgical system of any of Clauses 10-12, wherein the control circuit configuration to implement the threshold-based pause comprises the control circuit configured to: receive a signal from the sensor indicative of the parameter; and pause the tissue treatment event based on the sensor signal and a predetermined threshold of the parameter.

Clause 14. The surgical system of Clause 13, wherein the control circuit is configured to implement the future pause independent of the predetermined threshold.

Clause 15. The surgical system of any of Clauses 10-14, wherein the characteristic of the future pause comprises at least one of a duration, a frequency, or a starting point.

Clause 16. The surgical system of any of Clauses 10-15, wherein the control circuit configuration to implement the threshold-based pause comprises the control circuit configured to disconnect power to the motor.

Clause 17. The surgical system of Clause 16, wherein the control circuit configuration to resume the tissue treatment event comprises the control circuit configured to reconnect the power to the motor.

Clause 18. The surgical system of any of Clauses 10-17, wherein the threshold-based pause is a first pause, wherein the future pause is a second pause that follows the first pause, and wherein the control circuit is configured to implement a third pause after the second pause based on the change in the parameter during the first pause and during the second pause.

Clause 19. The surgical system of any of Clauses 10-18, wherein the control circuit is configured to adjust a setting of the motor based on the change in the parameter.

Clause 20. The surgical system of Clause 19, wherein the setting of the motor is a speed of the motor.

Clause 21. A surgical system for deploying staples from a staple cartridge reload into tissue, the surgical system comprises an end effector, comprising: a first jaw; a second jaw, wherein at least one of the first jaw and the second jaw is movable to grasp the tissue between the first jaw and the second jaw; a motor operable to move a sled along a staple-forming distance to lift staple drivers within the staple cartridge reload to exert a force to form the staples between the first jaw and the second jaw; a first sensor configured to measure a first parameter indicative of the force to form the staples between the first jaw and the second jaw; a second sensor configured to measure a second parameter indicative of a position of the sled along the staple-forming distance; and a control circuit communicatively connected to the motor, the first sensor, and the second sensor, wherein the control circuit is configured to: receive a first signal from the first sensor indicative of the first parameter; receive a second signal from the second sensor indicative of the second parameter; and detect staple malformation of the staples based on the first signal and the second signals.

Clause 22. The surgical system of Clause 21, wherein the configuration of the control circuit to detect the staple formation comprises the control circuit configured to: determine an initial buckling force associated with formation of the staples along the staple-forming distance based on the first signal and the second signal; and determine a final crunching force associated with the formation of the staples along the staple-forming distance based on the first signal and the second signal.

Clause 23. The surgical system of Clause 22, wherein the control circuit is further configured to adjust an operational parameter of the surgical system based on the initial buckling force and the final crunch force.

Clause 24. The surgical system of Clause 23, further comprising a user interface, wherein the configuration of the control circuit to adjust the operational parameter comprises the control circuit configured to recommend, through the user interface, a different staple cartridge reload.

Clause 25. The surgical system of Clause 22, wherein the configuration of the control circuit to detect the staple malformation further comprises the control circuit configured to compare the initial buckling force to the final crunching force.

Clause 26. The surgical system of Clause 22, wherein the configuration of the control circuit to detect the staple formation comprises the control circuit configured to determine a mathematical relation between the initial buckling force and the final crunching force indicative of the staple malformation.

Clause 27. The surgical system of Clause 26, wherein the mathematical relation is indicative of the initial buckling force being lesser than the final crunching force.

Clause 28. The surgical system of Clause 21, wherein the staple-forming distance is a distance movable by the sled while in contact with the staple drivers.

Clause 29. The surgical system of Clause 21, wherein the staple-forming distance is selected based on the staple cartridge reload.

Clause 30. A surgical system for deploying staples from a staple cartridge into tissue, the surgical system comprising: an end effector, comprising: a first jaw; and a second jaw movable relative to the first jaw to grasp the tissue between the first jaw and the second jaw; a motor operable in a tissue treatment event to move a drive shaft to motivate a sled to deploy staples from the staple cartridge into the tissue between the first jaw and the second jaw and motivate a knife to cut the tissue; and a control circuit communicatively connected to the motor, wherein the control circuit is configured to: implement a threshold-based pause of the tissue treatment event; resume the tissue treatment event after the threshold-based pause; determine a characteristic of a future pause in a remainder of the tissue treatment event based on a change in a parameter indicative of a tissue response during the threshold-based pause; and implement the future pause in accordance with the characteristic determined based on the change in the parameter.

Clause 31. The surgical system of Clause 30, further comprising a sensor configured to measure the parameter, wherein the sensor is communicatively connected to the control circuit.

Clause 32 The surgical system of Clause 31, wherein the parameter is a force exerted against the drive shaft.

Clause 33. The surgical system of Clause 31, wherein the control circuit configuration to implement the threshold-based pause comprises the control circuit configured to: receive a signal from the sensor indicative of the parameter; and pause the tissue treatment event based on the sensor signal and a predetermined threshold of the parameter.

Clause 34. The surgical system of Clause 33, wherein the control circuit is configured to implement the future pause independent of the predetermined threshold.

Clause 35. The surgical system of Clause 30, wherein the characteristic of the future pause comprises at least one of a duration, a frequency, or a starting point.

Clause 36. The surgical system of Clause 30, wherein the control circuit configuration to implement the threshold-based pause comprises the control circuit configured to disconnect power to the motor.

Clause 37. The surgical system of Clause 36, wherein the control circuit configuration to resume the tissue treatment event comprises the control circuit configured to reconnect the power to the motor.

Clause 38. The surgical system of Clause 30, wherein the threshold-based pause is a first pause, wherein the future pause is a second pause that follows the first pause, and wherein the control circuit is configured to implement a third pause after the second pause based on the change in the parameter during the first pause and during the second pause.

Clause 39. The surgical system of Clause 30, wherein the control circuit is configured to adjust a setting of the motor based on the change in the parameter.

Clause 40. The surgical system of Clause 39, wherein the setting of the motor is a speed of the motor.

It is worthy to note that any reference numbers included in the appended claims are used to reference exemplary embodiments/elements described in the present disclosure. Accordingly, any such reference numbers are not meant to limit the scope of the subject matter recited in the appended claims.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more than one" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more than one" or "at least one" and indefinite articles such as "a" or "an" (e.g., "a" and/or "an" should typically be interpreted to mean "at least one" or "one or more than one"); the same holds true for the use of definite articles used to introduce claim recitations. The singular form of "a", "an", and "the" include the plural references unless the context clearly dictates otherwise.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A surgical system for deploying staples from a staple cartridge reload into tissue, the surgical system comprising:
   an end effector, comprising:
      a first jaw; and
      a second jaw, wherein at least one of the first jaw and the second jaw is movable to grasp the tissue between the first jaw and the second jaw;
   a motor operable to move a sled along a staple-forming distance to lift staple drivers within the staple cartridge reload to exert a force to form the staples between the first jaw and the second jaw;
   a first sensor configured to measure a first parameter indicative of the force to form the staples between the first jaw and the second jaw;
   a second sensor configured to measure a second parameter indicative of a position of the sled along the staple-forming distance; and
   a control circuit communicatively connected to the motor, the first sensor, and the second sensor, wherein the control circuit is configured to:
      receive a first signal from the first sensor indicative of the first parameter;
      receive a second signal from the second sensor indicative of the second parameter; and
      detect staple malformation of the staples based on the first signal and the second signals.

2. The surgical system of claim 1, wherein the configuration of the control circuit to detect the staple malformation comprises the control circuit configured to:
   determine an initial buckling force associated with formation of the staples along the staple-forming distance based on the first signal and the second signal; and
   determine a final crunching force associated with the formation of the staples along the staple-forming distance based on the first signal and the second signal.

3. The surgical system of claim 2, wherein the control circuit is further configured to adjust an operational parameter of the surgical system based on the initial buckling force and the final crunch force.

4. The surgical system of claim 3, further comprising a user interface, wherein the configuration of the control circuit to adjust the operational parameter comprises the control circuit configured to recommend, through the user interface, a different staple cartridge reload.

5. The surgical system of claim 2, wherein the configuration of the control circuit to detect the staple malformation further comprises the control circuit configured to compare the initial buckling force to the final crunching force.

6. The surgical system of claim 2, wherein the configuration of the control circuit to detect the staple malformation comprises the control circuit configured to determine a mathematical relation between the initial buckling force and the final crunching force indicative of the staple malformation.

7. The surgical system of claim 6, wherein the mathematical relation is indicative of the initial buckling force being lesser than the final crunching force.

8. The surgical system of claim 1, wherein the staple-forming distance is a distance movable by the sled while in contact with the staple drivers.

9. The surgical system of claim 1, wherein the staple-forming distance is selected based on the staple cartridge reload.

10. A surgical system for deploying staples from a staple cartridge into tissue, the surgical system comprising:
   an end effector, comprising:
      a first jaw; and
      a second jaw movable relative to the first jaw to grasp the tissue between the first jaw and the second jaw;
   a motor operable in a tissue treatment event to move a drive shaft to motivate a sled to deploy staples from the staple cartridge into the tissue between the first jaw and the second jaw and motivate a knife to cut the tissue; and
   a control circuit communicatively connected to the motor, wherein the control circuit is configured to:
      implement a threshold-based pause of the tissue treatment event;
      resume the tissue treatment event after the threshold-based pause;
      determine a characteristic of a future pause in a remainder of the tissue treatment event based on a change in a parameter indicative of a tissue response during the threshold-based pause; and
      implement the future pause in accordance with the characteristic determined based on the change in the parameter.

11. The surgical system of claim 10, further comprising a sensor configured to measure the parameter, wherein the sensor is communicatively connected to the control circuit.

12. The surgical system of claim 11, wherein the parameter is a force exerted against the drive shaft.

13. The surgical system of claim 11, wherein the control circuit configuration to implement the threshold-based pause comprises the control circuit configured to:
   receive a signal from the sensor indicative of the parameter; and
   pause the tissue treatment event based on the sensor signal and a predetermined threshold of the parameter.

14. The surgical system of claim 13, wherein the control circuit is configured to implement the future pause independent of the predetermined threshold.

15. The surgical system of claim 10, wherein the characteristic of the future pause comprises at least one of a duration, a frequency, or a starting point.

16. The surgical system of claim 10, wherein the control circuit configuration to implement the threshold-based pause comprises the control circuit configured to disconnect power to the motor.

17. The surgical system of claim 16, wherein the control circuit configuration to resume the tissue treatment event comprises the control circuit configured to reconnect the power to the motor.

18. The surgical system of claim 10, wherein the threshold-based pause is a first pause, wherein the future pause is a second pause that follows the first pause, and wherein the control circuit is configured to implement a third pause after the second pause based on the change in the parameter during the first pause and during the second pause.

19. The surgical system of claim 10, wherein the control circuit is configured to adjust a setting of the motor based on the change in the parameter.

20. The surgical system of claim 19, wherein the setting of the motor is a speed of the motor.

* * * * *